(12) United States Patent
Suzuki et al.

(10) Patent No.: US 8,446,660 B2
(45) Date of Patent: *May 21, 2013

(54) ELECTROCHROMIC DISPLAY DEVICE

(75) Inventors: Masao Suzuki, Tsukuba (JP); Tetsuya Higuchi, Tsukuba (JP); Wu Weng, Tsukuba (JP); Toshimi Fukuoka, Tsukuba (JP)

(73) Assignees: Funai Electric Advanced Applied Technology Research Institute Inc., Daito-shi (JP); Funai Electric Co., Ltd., Daito-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/056,280

(22) PCT Filed: May 27, 2009

(86) PCT No.: PCT/JP2009/059681
§ 371 (c)(1),
(2), (4) Date: Jan. 27, 2011

(87) PCT Pub. No.: WO2010/013532
PCT Pub. Date: Feb. 4, 2010

(65) Prior Publication Data
US 2011/0141544 A1      Jun. 16, 2011

(30) Foreign Application Priority Data
Jul. 28, 2008   (JP) ................. 2008-193315

(51) Int. Cl.
*G02F 1/153*   (2006.01)
(52) U.S. Cl.
USPC ......................... 359/273; 359/242

(58) Field of Classification Search
USPC ........................................ 359/273
See application file for complete search history.

(56) References Cited

U.S. PATENT DOCUMENTS

| | | | |
|---|---|---|---|
| 6,816,298 B2 * | 11/2004 | Nishikitani et al. | 359/272 |
| 2005/0227071 A1 | 10/2005 | Muraoka et al. | |
| 2008/0316573 A1 * | 12/2008 | Shim et al. | 359/265 |

FOREIGN PATENT DOCUMENTS

| | | | |
|---|---|---|---|
| EP | 1887416 | * | 2/2008 |
| JP | 63-106731 A | | 5/1988 |
| JP | 6-32675 A | | 2/1994 |

(Continued)

OTHER PUBLICATIONS

Taiki Takei, et al., "Shushu no Mediator Sonzai Ka deno Dibenzylviologem no Electrochromic Tokusei", Abstracts of Autumn meeting of the Electrochemical Society of Japan, Sep. 19, 2007, vol. 2007, p. 189.

(Continued)

*Primary Examiner* — James Jones
(74) *Attorney, Agent, or Firm* — Crowell & Moring LLP

(57) ABSTRACT

Disclosed is an electrochromic display device, including, a first substrate, first electrodes provided on an upper surface of the first substrate, a second substrate provided to be opposed to the first substrate above the first substrate, the second substrate being formed of a transparent material, second electrodes provided on an undersurface of the second substrate, at least a part of the second electrodes being formed of a transparent electrode material, and an electrochromic composition layer provided between the first substrate and the second substrate. The electrochromic composition layer contains an electrochromic composition including a supporting electrolyte, a polar solvent, a leuco dye, a hydroquinone derivative and/or a catechol derivative, a ferrocene derivative, and a compound having a carbonyl group.

13 Claims, 10 Drawing Sheets

FOREIGN PATENT DOCUMENTS

| JP | 6-200378 A | 7/1994 |
|---|---|---|
| JP | 8-186245 A | 7/1996 |
| JP | 2003-315840 A | 11/2003 |
| JP | 2004-124088 A | 4/2004 |
| JP | 2005-314526 A | 11/2005 |
| JP | 2006-145669 A | 6/2006 |
| JP | 2007-178733 A | 7/2007 |
| JP | 2007-314721 A | 12/2007 |
| JP | 2008-89706 A | 4/2008 |
| JP | 2009-86259 A | 4/2009 |
| JP | 2009-98632 A | 5/2009 |
| JP | 2009-128818 A | 6/2009 |

OTHER PUBLICATIONS

Yuya Yamada, et al., "Mediator o Mochiita Viologen Kagobutsu no Electrochromic Tokusei", Imaging Conference Japan Ronbunshu, Jun. 6, 2007, vol. 2007, pp. 47 to 50.

Hideki Masuda, et al. "Ordered Metal Nanohole Arrays Made by a Two-Step Replication of Honeycomb Structures of Anodic Alumina", Science vol. 268, Jun. 9, 1995, pp. 1466 to 1468.

Hideki Masuda, et al., "Fabrication of a Nanostructured Diamond Honeycomb Film", Advanced Materials 2000, vol. 12, No. 6, pp. 444 to 447.

International Search Report dated Aug. 18, 2009 with English translation (four (4) pages).

Higuchi T. et al.: "High Speed Passive Matrix Electronic Paper Using Leuco Dye", IDW '09; Proceedings of the 16$^{th}$ International Display Workshops, vol. 2, Dec. 9, 2009, pp. 1391-1394, XP009153762.

Extended European Search Report dated Nov. 17, 2011 (seven (7) pages).

Chinese Office Action date Dec. 29, 2011 including English-language translation (Ten (10) pages).

* cited by examiner

ELECTROCHROMIC DISPLAY DEVICE

TECHNICAL FIELD

The present invention relates to an electrochromic display device.

BACKGROUND ART

Publications in the form of electronic books, i.e. electronic publications, have begun to be actively performed in place of publications produced by conventional printing techniques in association with the spread of electronic information networks. For example, cathode ray tube (CRT) displays and back light type liquid crystal displays are generally used as devices to display electronic information distributed through such networks. The displays using these displays have, however, a limitation in places where the displays are read, and the displays are also inferior in their handling in terms of weights, sizes, shapes, and portability, in comparison with the common displays printed on sheets of paper. Furthermore, because these displays consume large electric power, the displays also have a limitation on their display times in the case where the displays are driven by batteries. Furthermore, all of these displays are light emitting type displays, and consequently they also have a problem of causing severe fatigue at the time of a long time gaze.

Accordingly, a display device or a rewritable display device capable of resolving the aforesaid problems has been desired. A device called a paper-like display or electronic paper has been proposed as such a display device. To put it concretely, for example, a display device of a reflective liquid crystal system, a display device of an electrophoresis system, a display device of a system of rotating dichromatic particles in an electric field, a display device of an electrochromic system (see, for example, Patent Documents 1 and 2), and the like have been proposed in the past.

Now, in the display device of the electrochromic system (electrochromic display device), for example, an electrochromic composition containing a dye precursor, such as a leuco dye, which colors on the surface of an electrode, as an essential ingredient is used as a display material. The leuco dye is a superior material as an electrochromic material because the leuco dye is versatile as a recording material for thermal recording and the like and consequently can be easily obtained and procured, and because there is a possibility that the leuco dye is capable of displaying each color.

PRIOR ART DOCUMENTS

Patent Documents

Patent Document 1: Japanese Patent Application Laid-Open Publication No. 2008-089706
Patent Document 2: Japanese Patent Application Laid-Open Publication No. 2003-315840

SUMMARY OF THE INVENTION

Problems to be Solved by the Invention

The electrochromic display device using the leuco dye, however, has unstable factors, such as gradual deterioration of its display performance and erasing performance, and gradual coloration of the backgrounds of displays as the display and erasing thereof are repeated.

It is an object of the present invention to provide an electrochromic display device using a leuco dye having superior repetition stability.

Means for Solving Problems

In order to solve the problems described above, a first aspect of the invention is an electrochromic display device, including, a first substrate, a first electrode provided on an upper surface of the first substrate, a second substrate provided to be opposed to the first substrate above the first substrate, the second substrate being formed of a transparent material, a second electrode provided on an undersurface of the second substrate, at least a part of the second electrode being formed of a transparent electrode material, and an electrochromic composition layer provided between the first substrate and the second substrate, wherein the electrochromic composition layer contains an electrochromic composition including a supporting electrolyte, a polar solvent, a leuco dye, a hydroquinone derivative and/or a catechol derivative, a ferrocene derivative, and a compound having a carbonyl group.

A second aspect of the invention is the electrochromic display device, wherein the compound having the carbonyl group is at least any one of an acetophenone derivative, a dibenzoyl derivative, and a β-diketone compound.

A third aspect of the invention is the electrochromic display device, wherein the β-diketone compound is at least any one of an acetylacetone derivative, a cyclohexanone derivative, a cyclohexane dione derivative, and a benzoylacetone derivative.

A fourth aspect of the invention is the electrochromic display devices, wherein the polar solvent is at least one kind of an organic solvent having a property of passing a current by using the supporting electrolyte.

A fifth aspect of the invention is the electrochromic display device, wherein the electrochromic display device executes a display by applying a current between the first electrode and the second electrode, and executes erasing of the display by applying a current between the first electrode and the second electrode in a direction opposite to a direction of a current to be applied for executing the display, and an aluminum oxide and/or an aluminum hydroxide to absorb the leuco dye at a time of applying a current for executing the erasing is added to the electrochromic composition.

A sixth aspect of the invention is the electrochromic display device, wherein the electrochromic display device executes a display by applying a current between the first electrode and the second electrode, and executes erasing of the display by applying a current between the first electrode and the second electrode in a direction opposite to a direction of a current to be applied for executing the display, and an absorption layer containing an aluminum oxide and/or an aluminum hydroxide to absorb the leuco dye at a time of applying a current for executing the erasing is provided between the first electrode and the electrochromic composition layer.

A seventh aspect of the invention is the electrochromic display device, wherein the supporting electrolyte is a compound represented by a following general formula (1) and/or a compound represented by a following general formula (2).

[Chemical formula 1]

$$M_1X_1 \qquad (1)$$

(In the formula, $M_1$ denotes Li, Na, K, Rb, Cs or $NH_4$. In the formula, $X_1$ denotes $ClO_4$, $BF_4$, $CF_3SO_3$, or $PF_6$.)

[Chemical formula 2]

(In the formula, $R_a$ denotes an alkyl group or an aryl group. In the formula, Rb denotes an alkyl group. In the formula, N denotes a nitrogen atom. In the formula, $X_2$ denotes Cl, Br, I, $ClO_4$, $BF_4$, $CF_3SO_3$, or $PF_6$. In the formula, n denotes 0, 1, or 2. In the formula, m denotes 4-n.)

An eighth aspect of the invention is the electrochromic display device, wherein a polymer compound is added to the electrochromic composition.

A ninth aspect of the invention is the electrochromic display device, wherein the first electrode is one of a plurality of electrodes extending in parallel with each other, the second electrode is one of transparent display electrodes composed of a plurality of transparent electrodes extending in parallel with each other in a direction perpendicular to a direction of the first electrode; and pixels are formed at regions where the first electrode and the second electrode three-dimensionally intersect with each other.

Effects of the Invention

According to the present invention, there is provided an electrochromic display device including: a first substrate; first electrodes provided on an upper surface of the first substrate; a second substrate provided to be opposed to the first substrate above the first substrate, the second substrate formed of a transparent material; second electrodes provided on an undersurface of the second substrate, at least a part of the second electrodes being formed of a transparent electrode material; and an electrochromic composition layer provided between the first substrate and the second substrate, wherein the electrochromic composition layer contains an electrochromic composition including a supporting electrolyte, a polar solvent, a leuco dye, a hydroquinone derivative and/or a catechol derivative, a ferrocene derivative, and a compound having a carbonyl group.

That is, in the electrochromic display device using a leuco dye, the electrochromic composition includes a hydroquinone derivative and/or a catechol derivative, a ferrocene derivative, and a compound having a carbonyl group in addition to a supporting electrolyte, a polar solvent, and the leuco dye, and consequently the electrochromic display device is capable of suppressing the deterioration of the display performance and the erasing performance thereof, and the coloration of the backgrounds of the displays thereof caused by the repetition of the display and erasing thereof. Hence, it is possible to provide an electrochromic display device having superior repetition stability.

EMBODIMENT FOR CARRYING OUT THE INVENTION

In the following, the modes of electrochromic display devices according to the present invention will be described in detail with reference to the accompanying drawings. However, the scope of the invention is not limited to the shown examples.

<Configuration of Electrochromic Display Device>

Figure 1A:
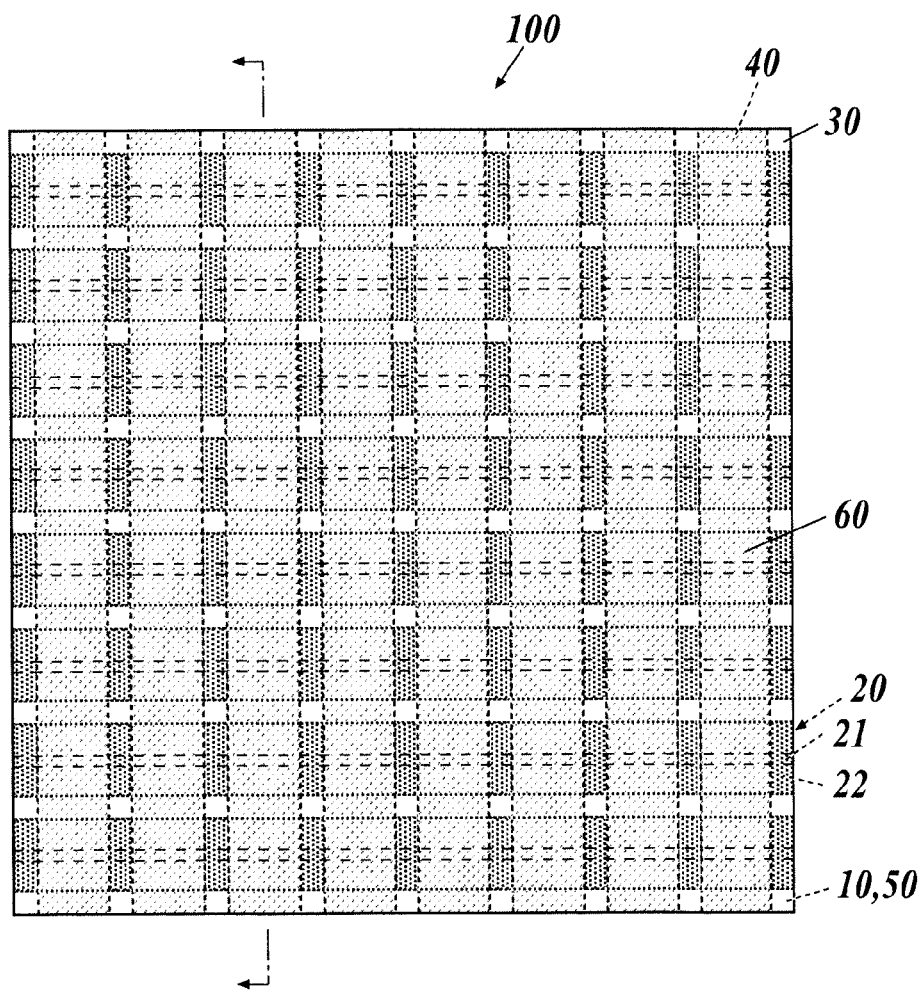
FIG. 1A is a plan view schematically showing an electrochromic display device of the present invention.
Figure 1B:
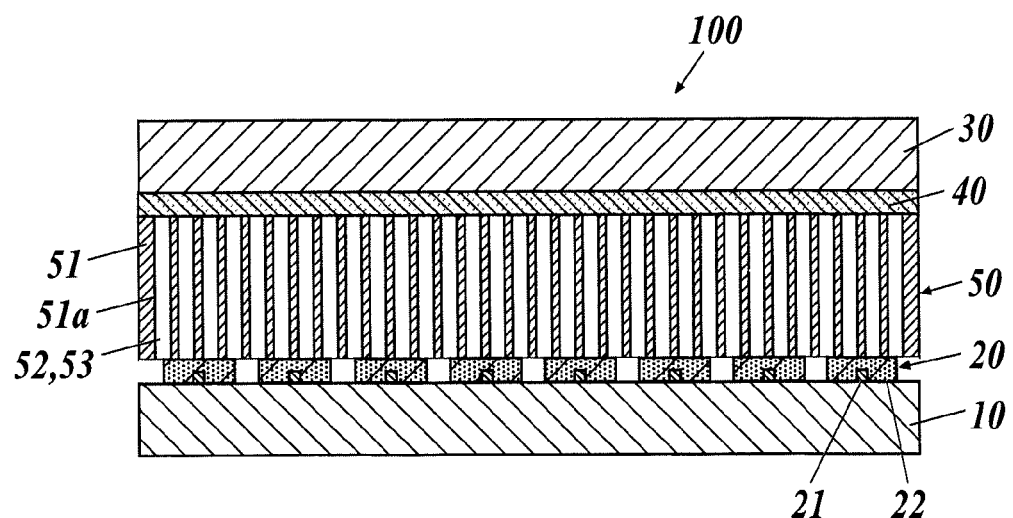
FIG. 1B is a sectional view schematically showing the electrochromic display device of the present invention.

FIG. 1A is a plan view schematically showing an electrochromic display device 100 of the present invention, and FIG. 1B is a sectional view schematically showing the electrochromic display device 100 of the present invention.

The electrochromic display device 100 of the present invention is composed of, for example, a first substrate 10, first electrodes 20 . . . provided on the upper surface of the first substrate 10, a second substrate 30 provided to be opposed to the first substrate 10 above the first substrate 10, second electrodes 40 . . . provided on the undersurface of the second substrate 30, and an electrochromic composition layer 50 provided between the first substrate 10 and the second substrate 30.

The electrochromic display device 100 is configured to execute a display by applying a current between the first electrodes 20 . . . and the second electrodes 40 . . . . Furthermore, the electrochromic display device 100 is configured to execute the erasing of the display by applying a current in the direction opposite to the current to be applied for executing the display, or by blocking the passage of a current for executing the display.

The first electrodes 20 . . . are, for example, a plurality of electrodes extending in parallel with each other. The second electrodes 40 . . . are, for example, transparent display electrodes composed of a plurality of transparent electrodes extending in parallel with each other in the direction perpendicular to the direction of the first electrodes 20 . . . . Pixels 60 are formed in the regions where the first electrodes 20 ... and the second electrodes 40 ... three-dimensionally intersect with each other.

The first substrate 10 is, for example, formed in a planar state, and has a function of the base substrate of the electrochromic display device 100.

The quality of material of the first substrate 10 is not particularly limited as long as the material is electrically insulative, and, for example, glass or plastic can be used. As the glass, for example, soda-lime based glass, low alkali borosilicate glass, alkali-free borosilicate glass, alkali-free aluminosilicate glass, and quartz glass can be given. Furthermore, as the plastic, for example, polyesters, such as polyethylene terephthalate and polyethylene naphtahalate; polyamides; polycarbonates; fluoropolymers, such as polyvinylidene fluoride; polyethers; polyolefins, such as polystyrene and polyethylene; and polyimides can be given.

The first substrate 10 is preferably seen to be white. Accordingly, if the quality of material of the first substrate 10 is set to be glass or plastic, the first substrate 10 that is seen to be white can be formed by blending a white pigment, such as titanium dioxide, barium sulfate, and kaolin, to the glass or the plastic. Furthermore, the first substrate 10 that is seen to be white can be formed by coating the white pigment on the undersurface of a transparent substrate, or by placing a white sheet, such as a white sheet of paper and a white polyethylene terephthalate (PET) sheet, thereon.

The first electrodes 20 ... are formed in, for example, lines, each having a width, to be provided in stripes in parallel with each other at regular intervals. To put it concretely, each of the first electrodes 20 ... is composed of, for example, as shown in FIG. 1, a metal electrode portion 21 formed in a line and a transparent electrode portion 22 formed in a line having a width to cover the metal electrode portion 21.

The first electrodes 20 ... are provided on the upper surface of the first substrate 10 in such a way that the first electrodes 20 ... contact with the electrochromic composition layer 50, and that the first electrodes 20 ... are opposed to the second electrodes 40 ... with the electrochromic composition layer 50 put between the first electrodes 20 ... and the second electrodes 40 ....

Each of the first electrodes 20 ... has a function of applying a current through the electrochromic composition layer 50 by forming a counterpart to each of the second electrodes 40 ....

The first electrodes 20 ... three-dimensionally intersect with the second electrodes 40 ..., that is, intersect with the second electrodes 40 ... with an interval between the first electrodes 20 ... and the second electrodes 40 ..., and form the pixels 60 in the regions of the intersection points.

The quality of material of each of the metal electrode portions 21 is not particularly limited as long as the quality of material enables the formation of a metal electrode. As the quality of material enabling the formation of the metal electrode, for example, gold, platinum, silver, chromium, aluminum, cobalt, palladium, copper, and nickel, and alloys of these atoms can be given.

The quality of material of each of the transparent electrode portions 22 is not particularly limited as long as the quality of material enables the formation of a transparent electrode. As the quality of material enabling the formation of the transparent electrode, for example, an indium tin oxide (ITO) film and a thin film subjected to a coating of $SnO_2$ or $InO_2$ can be given. Furthermore, a thin film formed by doping Sn, Sb, or the like on the ITO film or the thin film subjected to the coating of $SnO_2$ or $InO_2$ may be adopted, and MgO, ZnO, flourine-doped tin oxide (FTO), or the like may also be adopted.

Furthermore, even if the quality of material of each of the transparent electrode portions 22 is, for example, gold or platinum, the transparent electrode portions 22 can carry out the function thereof as long as the material is formed in a thin film.

The second substrate 30 is, for example, a transparent substrate formed in a planar state, and has a function of being a support member of the second electrodes 40 ....

The quality of material of the second substrate 30 is not particularly limited as long as the material is a transparent substrate being electrically insulative. For example, glass and plastic can be used. As the glass, for example, soda-lime based glass, low alkali borosilicate glass, alkali-free borosilicate glass, alkali-free aluminosilicate glass, and quartz glass can be given. Furthermore, as the plastic, for example, polyesters, such as polyethylene terephthalate and polyethylene naphtahalate; polyamides; polycarbonates; fluoropolymers, such as polyvinylidene fluoride; polyethers; polyolefins, such as polystyrene and polyethylene; and polyimides can be given.

Each of the second electrodes 40 ... is, for example, a transparent electrode formed in a line having a width, and the second electrodes 40 ... are provided in stripes in parallel with each other at regular intervals.

The second electrodes 40 ... are provided on the undersurface of the second substrate 30 in such a way that the second electrodes 40 ... contact with the electrochromic composition layer 50, and that the second electrodes 40 ... are opposed to the first electrodes 20 ... with the electrochromic composition layer 50 put between the first electrodes 20 ... and the second electrodes 40 ....

Each of the second electrodes 40 ... has a function of applying a current through the electrochromic composition layer 50 by forming a counter part to each of the first electrodes 20 ....

The second electrodes 40 ... three-dimensionally intersect with the first electrodes 20 ..., that is, intersect with the first electrodes 20 ... with an interval between the first electrodes 20 ... and the second electrodes 40 ..., and form the pixels 60 in the regions of the intersection points.

The quality of material of each of the second electrodes 40 ... is not particularly limited as long as the quality of material enables the formation of a transparent electrode. As the quality of material enabling the formation of the transparent electrode, for example, an ITO film and a thin film subjected to a coating of $SnO_2$ or $InO_2$ can be given. Furthermore, a thin film formed by doping Sn, Sb, or the like on the ITO film or the thin film subjected to the coating of $SnO_2$ or $InO_2$ may be adopted, and MgO, ZnO, FTO, or the like may also be adopted. Furthermore, even if the quality of material of each of the second electrodes 40 ... is, for example, gold or platinum, the second electrodes 40 can carry out the function thereof as long as the material is formed in a thin film.

The electrochromic composition layer 50 is composed of, for example, a porous body 51 including pores 51a ... piercing the porous body 51 in the direction almost perpendicular to the first substrate 10 and the second substrate 30, and electrochromic composition 52 introduced into each of the pores 51a ... of the porous body 51.

The porous body 51 has a role of holding the electrochromic composition 52 of a certain volume between the first substrate 10 and the second substrate 30. That is, the porous body 51 supports the electrochromic composition 52 between the first substrate 10 and the second substrate 30 by containing the electrochromic composition 52 in the porous body 51, and has a role of a spacer for controlling the quantity of the electrochromic composition 52 to be uniform with the thickness of the porous body 51.

The thickness of the porous body 51 is not particularly limited, but is preferably set within a range of from 10 μm to 500 μm, more preferably within a range of from 30 μm to 200 μm. Thereby, the display function of the electrochromic composition 52 can effectively be shown.

Figure 2:
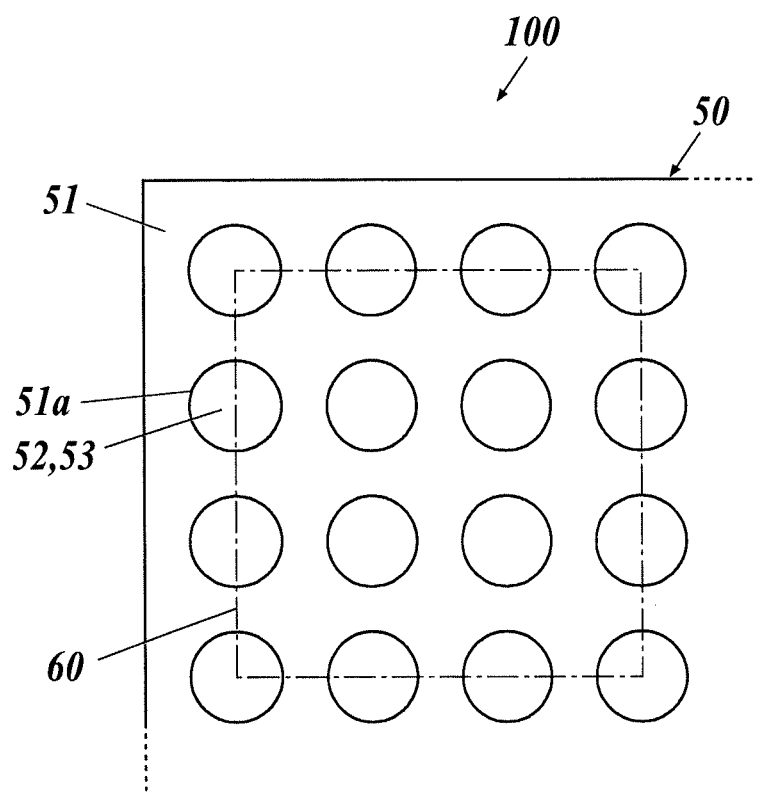
FIG. 2 is a diagram for describing a relation between the size of a pixel and the size of a pore of a porous body.

Although the size of each of the pores 51a ... of the porous body 51 is not particularly limited, for example, as shown in FIG. 2, the size is preferably smaller than the size of each of the pixels 60. That is, for example, as shown in FIG. 2, if the shape of each of the pores 51a ... is a circle, and if the shape of each of the pixels 60 (shown by an alternate long and short dash line in FIG. 2) is a regular square, then the diameter (pore size) of each of the pores 51a ... of the porous body 51 is preferably smaller than the width of each of the pixels 60 (that is, the width of each of the first electrodes 20 ... and the width of each of the second electrodes 40 ...).

As a matter of course, the shape of each of the pores 51a ... is not limited to a circle, but may be a polygon, such as a rectangle. Furthermore, the shape of each of the pixels 60 is not limited to a regular square, but may be another polygon, or may be a circle.

For example, if the size of each of the pores 51a ... of the porous body 51 is large (to put it concretely, for example, if the pore size is ⅕ or more of the width of each of the pixels 60), or, for example, if the distance between any two pores 51a, 51a in the porous body 51 is short (to put it concretely, for example, if the rate of pore areas is 50% or more), then a display image produced by the electrochromic display device 100 becomes an image having a high density and a high contrast. On the other hand, if the size of each of the pores 51a ... of the porous body 51 is small (to put it concretely, for example, if the pore size is 1/50 or less of the width of the pixels 60), or, for example, the distance between any two pores 51a, 51a of the porous body 51 is long (to put it concretely, for example, if the rate of pore areas is 20% or less), then the display image produced by the electrochromic display device 100 becomes a clear image having a high resolution and an excellent sharpness.

The quality of material of the porous body 51 is not particularly limited as long as the material can have the thicknesses and the shapes that have been described above, and both of inorganic materials and organic materials can be used.

As the preferable qualities of the materials, for example, alumina (particularly anodized alumina), silica, zirconium oxide, SiC, and glass can be given as electrically insulative inorganic materials. Teflon (registered trademark), nylon, polyester, polyimide, polycarbonate, and the like can be given as electrically insulative organic materials and polymeric materials. $TiO_2$, $SrTiO_3$, $ZnO$, $SnO_2$, $InSnO_x$, $Nb_2O_3$, $WO_3$, $CuO$, $CoO_2$, $MnO_2$, $V_2O_5$, and the like can be given as metal oxide materials including semiconductors. CdS; ZnS; GaP; GaAs; InP; $FeS_2$; PbS; $CuInS_2$; compound semiconductors typified by CuInSe and the like; compounds, complex compounds, and the like having a perovskite structure; and the like can be given as metal chalcogenides including compound semiconductors and complex compounds of the other elements. Gold, platinum, silver, copper, chromium, zinc, tin, titanium, tungsten, aluminum, nickel, iron, silicon, germanium, and the like can be given as metal and semimetal materials. Graphite, glassy carbon, diamond, and the like can be given as carbon materials. The quality of material of the porous body 51 is not, however, limited to those mentioned above.

The porous body 51 may be configured of a single material, and may be configured of a plurality of materials. If the porous body 51 is configured of a plurality of materials, the porous body 51 may be configured in such a way that the materials of respective parts, such as the wall parts of the pores 51a ... and the other parts, or the upper parts and the lower parts of the pores 51a ..., are different from each other.

An insulating material or a semiconductor material is preferable as the material constituting at least a part (walls of the pores 51a ... of the porous body 51) of the inner part of each of the pores 51a ... of the porous body 51. To put it concretely, metal chalcogenides (for example, oxides, sulfides, and selenides) and silicon are preferable; metal oxides are more preferable; and aluminum, alumina, and predetermined fibers (for example, Teflon (registered trademark), nylon, and polyester) are most preferable.

The producing method of the porous body 51 is not particularly limited as long as the method can make the porous bodies 51 having the thicknesses and the shapes mentioned above.

As an example of a preferable producing method, for example, a method of producing the porous body 51, controlling the pore pitches over a wide area for mass production can be given. To put it concretely, for example, a method of producing the porous body 51 by controlling self-organization reactions concerned with a diffusion and transportation of ions and molecules in a chemical reaction can be given. As the methods of producing the porous body 51 (porous nano-structure, porous membrane) having a regular pore arrangement caused by the self-organization, the following publicly-known techniques can be applied.

As the publicly-known techniques, for example, (1) anodized alumina produced by anode electrolytic oxidation (for example, Science, 268, 1466 (1995)), (2) a diamond porous nano-structure produced by placing a porous alumina film on a diamond film as a mold to perform plasma etching, and after that, by melting the porous alumina film by soft etching (for example, soft etching by phosphoric acid, or the like) (for example, Advanced Materials, 12, 444 (2000)), (3) a metal porous structure produced by transfer (for example, Japanese Patent Application Laid-Open Publication No. H 6-200378), (4) a silicon porous membrane produced by forming an aluminum-silicon mixed film on a substrate by a sputtering method, and by selectively etching only the aluminum regions (columnar structure regions containing aluminum) in the mixed film (As the etching method, wet etching using an acid or an alkali to selectively melt only aluminum is preferable.) (for example, Japanese Patent Application Laid-Open Publication No. H 8-186245), (5) a porous nano-structure made of various materials produced by once transferring the concavo-convex structures of pores to a polymer, such as poly methyl methacrylate, by using anodized alumina produced by self-organization, and after that, by forming a layer of inorganic metal oxide on the transfer body by a sol-gel reaction (for example, Japanese Patent Application Laid-Open Publication No. H 6-32675), (6) a porous membrane produced by producing a micro phase-separated structure film by forming a micro phase-separated structure oriented perpendicularly to the film direction at several tens of nanometer intervals by using block copolymer, and, for example, by melting a cylinder portion (for example, Japanese Patent Application Laid-Open Publications No. 2004-124088 and No. 2005-314526), (7) a porous membrane produced by forming pores in a high molecule, a metal, a plastic, or the like by selective etching, or a porous membrane produced by transferring the produced porous membrane to another high molecule, another metal, another plastic, or the like by using the produced porous membrane as a mold, and the like can be given, but the publicly-known techniques are not limited to those mentioned above.

Furthermore, as an example of a preferable producing method, for example, a method of suitably producing the porous body 51 formed in a lattice by using a screen printing method or a photolithographic method can be given.

In the case of using the screen printing method, there is a limitation of distance between any two pores 51a, 51a (about 30 μm or more), and there is a limitation of the rate of pore areas. However, the screen printing method can produce the porous bodies 51 having the thicknesses and the shapes mentioned above.

As preferable materials, because the electrochromic composition 52 contains a polar solvent as a constituent, the materials each having the resistance property to the polar solvent are preferable, and, for example, a glass paste and a thermosetting resin having a polar solvent-resistant property can be used. As the glass paste, for example, AP dielectric pastes AP5346G and AP5695BD, manufactured by Asahi Glass Co., Ltd., glass paste PLS-3124, manufactured by Nippon Electric Glass Co., Ltd., and powder glass LS-0241, manufactured by Nippon Electric Glass Co., Ltd., can be given, but the glass paste is not limited to those ones listed above. As the thermosetting resin having the polar solvent-resistant property, for example, one-pack type epoxy resin (to put it concretely, for example, 2217, 2217B, and 2219D in ThreeBond 2200 series, manufactured by ThreeBond Co., Ltd.) can be given, but the thermosetting resin is not limited to the one-pack type epoxy resin.

In the case of using the photolithographic method, the porous body 51 having a minute structure can be produced.

As the preferable material, the material having the resistance property to the polar solvent is preferable as described above. To put it concretely, for example, MEMS permanent resist TMMRS-2000, manufactured by Tokyo Ohka Kogyo Co., Ltd., which resist enables the obtainment of the porous body 51 having a high aspect ratio by one-time exposure, can be given, but the material is not limited to that one.

Furthermore, the porous body 51 may be commercially available one as long as the porous body 51 has the thickness and the shape mentioned above. As the commercially available porous body 51, for example, membrane filters (thickness: 60 μm; pore sizes: 0.2 μm, 0.1 μm, and 0.02 μm), made of aluminum oxide, which membrane filters can be obtained as Anodisc membrane filters, manufactured by Whatman Ltd.; Omnipore membranes (thicknesses: 80 μm and 100 μm; pore sizes: 0.1 μm, 0.2 μm, 0.45 μm, 1.0 μm, 5 μm, and 10 μm), manufactured by Millipore Corporation; nylon net filters (thickness: 55 μm; apertures (the sizes of gaps between threads): 11 μm, 20 μm, 41 μm, 60 μm, and 80 μm), manufactured by Millipore Corporation; super-high molecular weight polyethylene porous film Sun Maps (thicknesses: 100 μm and 200 μm; pore size: 17 μm), manufactured by Nitto Denko Corporation; NYTAL (nylon mesh cloth) NY-20HC (thickness: 55 μm; aperture: 20 μm), 21T-53 (thickness: 100 μm; aperture: 53 μm), ASTM 270-53 (thickness: 60 μm; aperture: 53 μm), NY5-HC (thickness: 100 μm; aperture: 5 μm), NY1-HD (thickness: 75 μm; aperture: 1 μm), manufactured by Sefa Inc.; PETEX (polyester mesh cloth) PET 51HC (thickness: 60 μm; aperture: 51 μm), PET 24 (thickness: 70 μm; aperture: 24 μm), PET 11HC (thickness: 60 μm; aperture: 11 μm), manufactured by Sefar Inc.; and the like can be given, but the commercially available porous body 51 is not limited to those listed above.

The electrochromic composition 52 contains a supporting electrolyte, a polar solvent, a leuco dye 52a, and a display quality deterioration suppression agent (a compound including a hydroquinone derivative and/or a catechol derivative, a ferrocene derivative, and a carbonyl group) for suppressing the deterioration of the display quality of the electrochromic display device 100.

An absorbent 53 to absorb the leuco dye 52a at the time of applying a current between the first electrodes 20 . . . and the second electrodes 40 . . . for executing the erasing is added to the electrochromic composition 52.

Furthermore, as the components capable of being added to the electrochromic composition 52, for example, a polymer compound for adjusting the physical properties (for example, thickening) of the electrochromic composition 52 can be given.

The electrochromic composition 52 has a function of coloring and color erasing of the display of the electrochromic display device 100.

To put it concretely, the electrochromic composition 52 is colored by applying a current between the first electrodes 20 . . . and the second electrodes 40 . . . , and the color is erased by applying a current in the direction opposite to the current to be applied for coloring, or by blocking the passage of a current for coloring.

The electrochromic composition 52 may be, for example, in a liquid having low viscosity, in a paste having high viscosity, or in a gel having little fluidity or the like, as long as the electrochromic composition 52 has fluidity.

The supporting electrolyte, which is the constituent of the electrochromic composition 52, has a function of making an electric current easily flow through the electrochromic composition 52. The supporting electrolyte contains a compound generally called a molten salt. As the supporting electrolyte, each compound may separately be used, or a plurality of compounds may be mixed to be used.

It is preferable to add the supporting electrolyte to the electrochromic composition 52 within a range of from 0.01% by weight to 20% by weight of the whole weight of the electrochromic composition 52, and more preferably to add it to the electrochromic composition 52 within a range of from 0.1% by weight to 20% by weight in order that the supporting electrolyte may sufficiently fulfill the aforesaid function.

To put it concretely, the supporting electrolyte is not particularly limited as long as the supporting electrolyte is a compound having the aforesaid function, and, for example, the compounds each having the general formula represented by the aforesaid formula (1) and/or the compounds each having the general formula represented by the aforesaid formula (2) can be given as the supporting electrolyte.

In the following, examples of the compounds each having the general formula represented by the aforesaid formula (1) and the compounds each having the general formula represented by the aforesaid formula (2) will be shown, but these compounds are illustrations, and do not limit the supporting electrolyte.

As the concrete examples of the compounds having the general formula represented by the aforesaid formula (1), for example, $NaClO_4$, $LiClO_4$, $KClO_4$, $RbClO_4$, $CsClO_4$, $NH_4ClO_4$, $LiBF_4$, and $LiPF_6$ can be given.

Furthermore, as the concrete examples of the compounds having the general formula represented by the aforesaid formula (2), for example, $(CH_3)_4NClO_4$, $(C_2H_5)_4NClO_4$, $(n-C_4H_9)_4NClO_4$, $(CH_3)_4NBF_4$, $(C_2H_5)_4NBF_4$, $(n-C_4H_9)_4NBF_4$, $(CH_3)_4NCl$, $(C_2H_5)_4NCl$, $(CH_3)_4NBr$, $(C_2H_5)_4NBr$, $(n-C_4H_9)_4NBr$, $(n-C_4H_6)_4NI$, $C_6H_5(CH_3)_3NClO_4$, $C_6H_5(C_2H_5)_3NClO_4$, $C_8H_{17}(CH_3)_3NClO_4$, $(C_2H_5)_4NPF_6$, $(n-C_4H_9)_4NPF_6$, $(CH_3)_4NCF_3SO_3$, and $(C_2H_5)_4NCF_3SO_3$ can be given.

The polar solvent, which is a constituent of the electrochromic composition 52, is at least one kind of an organic solvent having a property of passing a current by using a supporting electrolyte, and has a function of accelerating the passage of a current in order that the color erasing of the leuco dye 52a may be performed by blocking a voltage and/or a current. Furthermore, if a polymer compound is added to the electrochromic composition 52, the polar solvent also carries out a function as a solvent of the polymer compound. Various types of polar solvents may separately be used, or two types or more of them may suitably be combined to be used.

Although examples of the suitable polar solvent will be shown in the following, these are illustrations and do not limit the polar solvent.

As the concrete examples of the polar solvent, for example, N-methyl-pyrrolidone, dimethylformamide, diethylformamide, N,N-dimethylacetamide, N,N-dimethylacetoacetamide, propylene carbonate, dimethyl sulfoxide, γ-butyrolactone, acetonitrile, propionitrile, and butyronitrile can be given. All of the illustrated polar solvents are preferable as the polar solvent to be used as the constituent of the electrochromic composition 52, but N,N-dimethylacetamide can be given as particularly preferable one.

The leuco dye 52a, which is the constituent of the electrochromic composition 52 is a colorless or light-colored electron donative dye precursor, and is a compound coloring by a developer, such as a phenolic compound, an acidic substance, and an electron acceptable substance.

As the leuco dye 52a, for example, compounds that can practically be colorless and have a lactone, lactam, sultone, spiropyran, ester, or amide structure in their partial skeletons can be given. To put it concretely, for example, a triarylmethane compound, a bis-phenyl methane compound, a xanthenes compound, a fluoran compound, a thiazine compound, and a spiropyran compound can be given, but the leuco dye 52a is not limited to those ones.

The leuco dye 52a can color in various colors by suitably selecting compounds among the aforesaid ones. Consequently, the display colors of the electrochromic display device 100 using the leuco dye 52a can suitably be selected depending on the leuco dye 52a. To put it concretely, for example, if the leuco dye 52a coloring in black is used, monochrome and gray displays become possible.

Because the blending quantity of the leuco dye 52a depends on the solubility of the leuco dye 52a, it is difficult to unconditionally express the blending quantity, but it is needed that the sufficient amount of the leuco dye 52a is blended for coloring. If the leuco dye 52a has little solubility, it is desirable to adjust the blending quantity of the leuco dye 52a by, for example, enlarging the volume of the electrochromic composition layer 50 (the porous body 51) corresponding to each of the pixels 60 in order to contain the necessary quantity of the leuco dye 52a.

For example, if the leuco dye 52a is one of a compound represented by the following formula (13), a compound represented by the following formula (14), and a compound represented by the following formula (16), then the blending quantity can be made to be within a range of 3% by weight to 40% by weight of the whole of the electrochromic composition 52.

In the following, examples of the leuco dye 52a will be shown by being classified on the basis of their colors, but these are illustrations and do not limit the leuco dye 52a.

The following formulae (3) and (4) are leuco dyes 52a coloring in yellow.

[Chemical formulae 3]

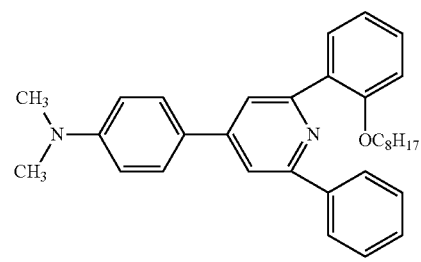
(3)

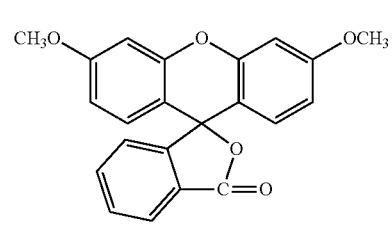
(4)

The following formulae (5) to (7) are leuco dyes 52a coloring in magenta.

[Chemical formulae 4]

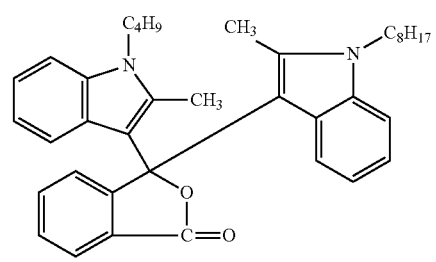
(5)

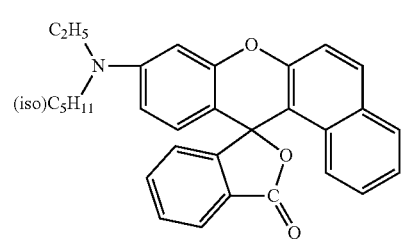
(6)

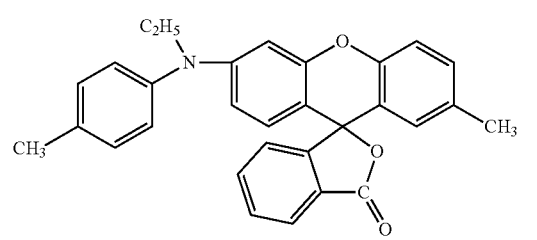
(7)

The following formulae (8) to (11) are leuco dyes 52a coloring in cyan.

[Chemical formulae 5]

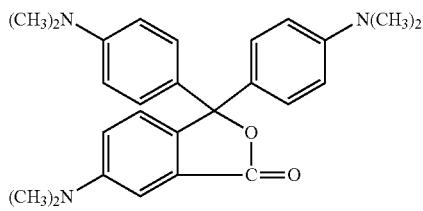
(8)

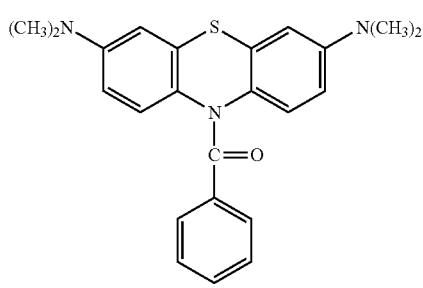
(9)

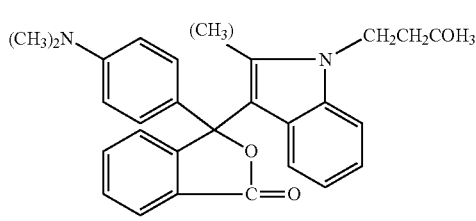
(10)

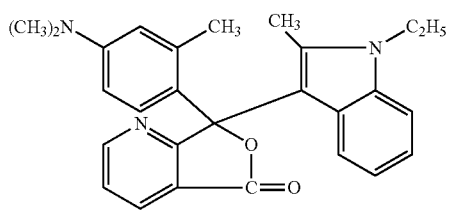
(11)

The following formulae (12) and (13) are leuco dyes 52a coloring in red.

[Chemical formulae 6]

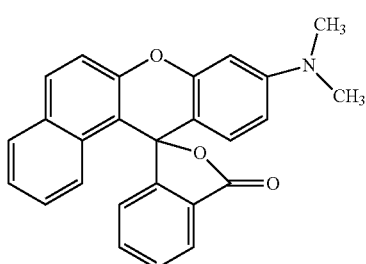
(12)

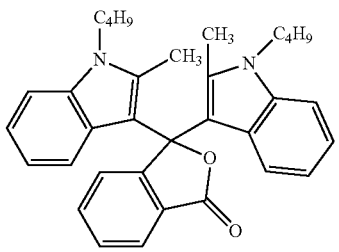
(13)

The following formula (14) is a leuco dye 52a coloring in blue.

[Chemical formula 7]

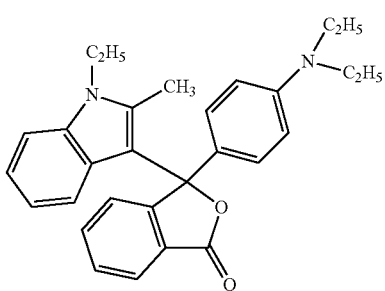
(14)

The following formulae (15) and (16) are leuco dyes 52a coloring in black.

[Chemical formulae 8]

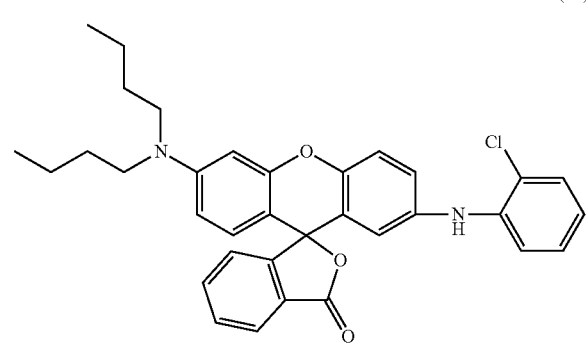
(15)

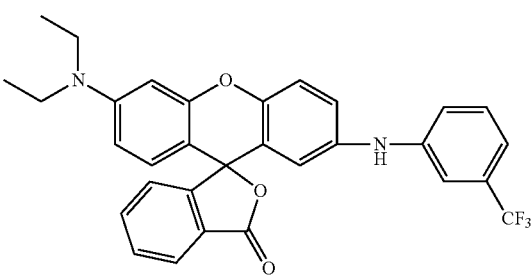
(16)

The display quality deterioration suppression agent, which is a constituent of the electrochromic composition 52, is a compound having a function of suppressing the deterioration of the display quality of the electrochromic display device 100 in association with the repetition operations of the coloring and the color erasing of the leuco dye 52a.

It is preferable to add the display quality deterioration suppression agent to the electrochromic composition 52 within a range of from 1% by weight to 70% by weight of the contained quantity of the leuco dye 52a as the additive quantity of the display quality deterioration suppression agent, and it is more preferable to add the display quality deterioration suppression agent to the electrochromic composition 52 within a range of from 5% by weight to 50% by weight in order to sufficiently fulfill the aforesaid function.

The display quality deterioration suppression agent is a mixture of a first display quality deterioration suppression compound (a compound (hydroquinone derivative) represented by the following general formula (17) and/or a compound (catechol derivative) represented by the following general formula (18)), a second display quality deterioration suppression compound (a compound (ferrocene derivative) represented by the following general formula (34)), and a third display quality deterioration suppression compound (a compound having a carbonyl group).

The hydroquinone derivative is a compound represented by the following general formula (17), and the catechol derivative is a compound represented by the following general formula (18). The electrochromic composition 52 has only to contain at least one of the hydroquinone derivative and the catechol derivative. That is, the electrochromic composition 52 may contain only the hydroquinone derivative, or contain only the catechol derivative. Alternatively, the electrochromic composition 52 may contain both of the hydroquinone derivative and the catechol derivative.

[Chemical formula 9]

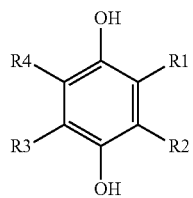

(17)

(In the formula, R1, R2, R3, and R4 denote a hydrogen atom, an alkyl group, an aryl group, an alkoxy group, a hydroxyl group, a nitro group, an alkyl carbonyl group, a formyl group, a carboxyl group, or an alkoxy carbonyl group. Alternatively, R1 and R2 in the formula and/or R3 and R4 in the formula may be condensed with each other to form a five member or six member condensed ring.)

[Chemical formula 10]

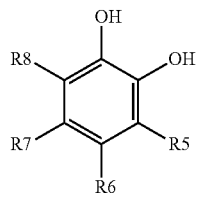

(18)

(In the formula, R5, R6, R7, and R8 denote a hydrogen atom, an alkyl group, an alkoxy group, an aryl group, a hydroxyl group, a nitro group, an alkyl carbonyl group, a formyl group, a carboxyl group, or an alkoxy carbonyl group. Alternatively, R5 and R6 in the formula, R6 and R7 in the formula, and/or R7 and R8 in the formula may be condensed with each other to form a five member or six member condensed ring.)

Although examples of the hydroquinone derivative will be shown by the following formulae (19) to (26), these are illustrations and do not limit the compound.

[Chemical formulae 11-1]

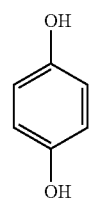

(19)

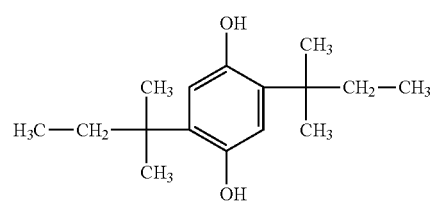

(20)

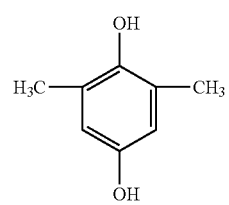

(21)

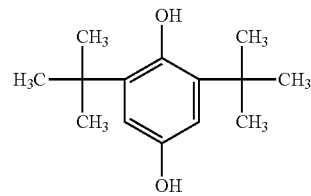

(22)

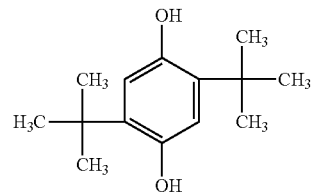

(23)

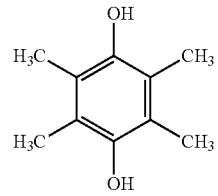

(24)

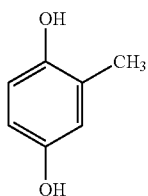

[Chemical formula 11-2]

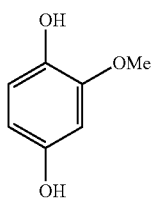

(26)

Although examples of the catechol derivative will be shown by the following formulae (27) to (33), these are illustrations and do not limit the compound.

[Chemical formulae 12-1]

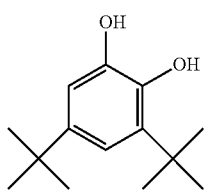

(27)

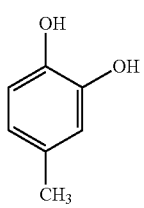

(28)

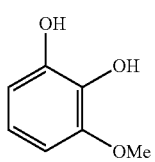

(29)

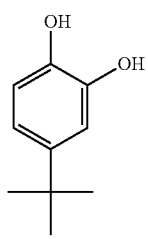

(30)

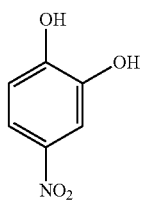

[Chemical formulae 12-2]

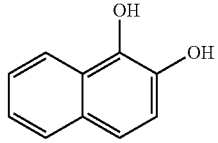

(32)

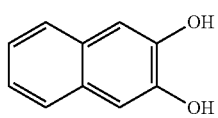

(33)

The ferrocene derivative is a compound represented by the following formula (34).

[Chemical formula 13]

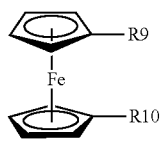

(In the formula, R9 and R10 denote a hydrogen atom, a bromine atom, a linear or a branched alkyl group, a methylol group, a 1 or 2 ethylol group, a phenyl group, a cyclopentenyl group, a diphenylphosphino group, an amino group, and an alkyl-substituted amino group. In the formula, Fe denotes an iron atom.)

Although examples of the ferrocene derivative will be shown by the following formulae (35) to (43), these are illustrations and do not limit the compound.

[Chemical formulae 14-1]

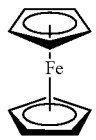

(35)

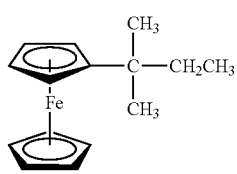

(36)

-continued

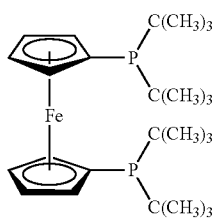 (37)

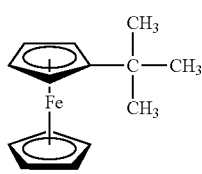 (38)

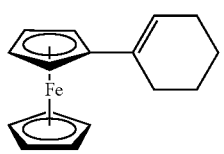 (39)

[Chemical formulae 14-2]

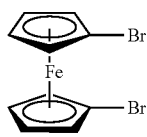 (40)

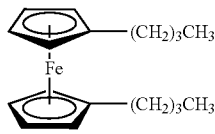 (41)

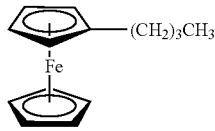 (42)

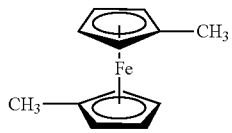 (43)

[Chemical formulae 15-1]

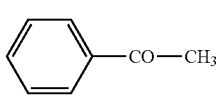 (44)

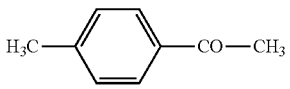 (45)

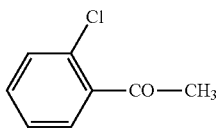 (46)

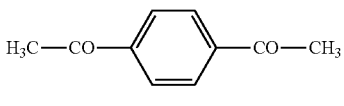 (47)

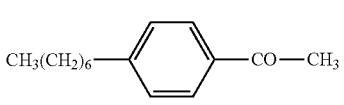 (48)

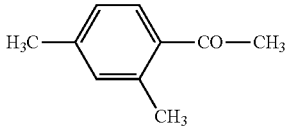 (49)

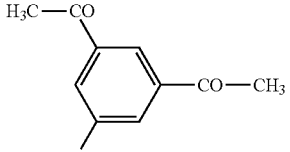 (50)

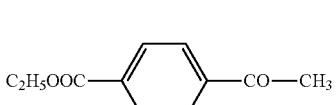 (51)

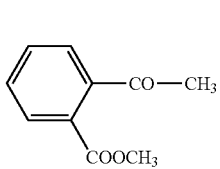 (52)

[Chemical formulae 15-2]

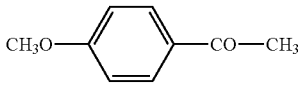 (53)

(54)

(55)

The compound having a carbonyl group, is, for example, at least any one of an acetophenone derivative, a dibenzoyl derivative (α-diketone compound), a β-diketone compound, and a benzoquinone derivative. The electrochromic composition 52 has only to contain at least any one of the acetophenone derivative, the dibenzoyl derivative (α-diketone compound), the β-diketone compound, and the benzoquinone derivative, but from the point of view of making the background (ground color) of a display whiter it is preferable for the electrochromic composition 52 to contain at least any one of the acetophenone derivative, the dibenzoyl derivative (α-diketone compound), and the β-diketone compound.

Although examples of the acetophenone derivative will be shown by the following formulae (44) to (56), these are illustrations and do not limit the compound.

(56)

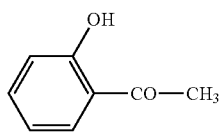

Although examples of the dibenzoyl derivative (α-diketone compound) will be shown by the following formulae (57) to (60), these are illustrations and do not limit the compound.

[Chemical formulae 16]

(57)

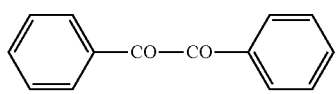

(58)

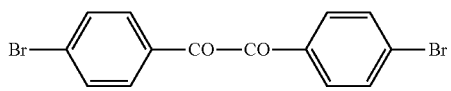

(59)

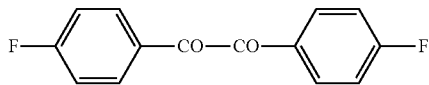

(60)

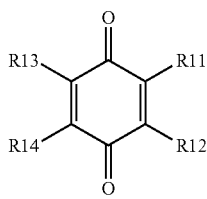

The benzoquinone derivative is a compound represented by the following general formulae (61) and (62).

[Chemical formula 17]

(61)

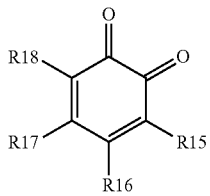

(In the formula, R11, R12, R13, and R14 denote a group selected from a hydrogen atom, an alkyl group, an aryl group, an alkoxy group, a hydroxyl group, a nitro group, an alkyl carbonyl group, a formyl group, a carboxyl group, and an alkoxy carbonyl group. In addition, there is not a case where all of the R11, R12, R13, and R14 are hydrogen atoms at the same time. Alternatively, R11 and R12 in the formula and/or R13 and R14 in the formula may be condensed with each other to form a five member or six member condensed ring.)

[Chemical formula 18]

(62)

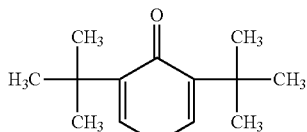

(In the formula, R15, R16, R17, and R18 denote a group selected from a hydrogen atom, an alkyl group, an aryl group, an alkoxy group, a hydroxyl group, a nitro group, an alkyl carbonyl group, a formyl group, a carboxyl group, and an alkoxy carbonyl group. In addition, there is not a case where all of the R15, R16, R17, and R18 are hydrogen atoms at the same time. Alternatively, R15 and R16 in the formula, R16 and R17 in the formula, and/or R17 and R18 in the formula may be condensed with each other to form a five member or six member condensed ring.)

Although examples of the compounds each having the general formula represented by the aforesaid formula (61) will be shown by the following formulae (63) to (68), these are illustrations and do not limit the compound.

[Chemical formulae 19]

(63)

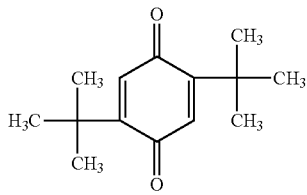

(64)

(65)

(66)

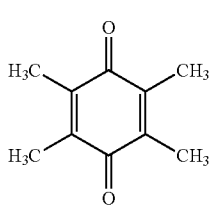

(67)
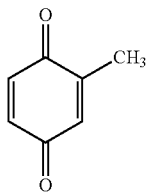

(68)
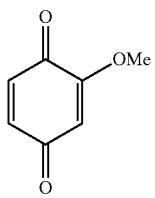

Although examples of the compounds each having the general formula represented by the aforesaid formula (62) will be shown by the following formulae (69) to (73), these are illustrations and do not limit the compound.

[Chemical formulae 20]

(69)
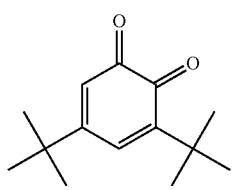

(70)
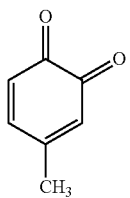

(71)
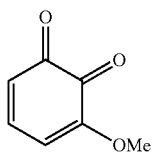

(72)
(73)
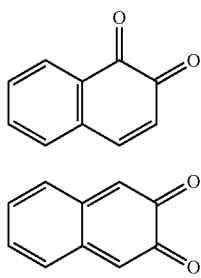

The β-diketone compound is a compound represented by the following general formula (74). To put it concretely, for example, the β-diketone compound is at least any one of an acetylacetone derivative, a cyclohexanone derivative, a cyclohexane dione derivative, and a benzoylacetone derivative.

[Chemical formula 21]

(74)
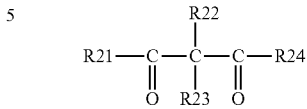

(In the formula, R21 and R24 denote a group selected from an alkyl group, a trifluoromethyl group, and a substituent or an un-substituent phenyl group. In the formula, R22 and R23 denote a group selected from a hydrogen atom, an alkyl group, an acetyl group, and a substituent or an un-substituent phenyl group. Alternatively, R21, and R22 or R23 in the formula; R24, and R22 or R23 in the formula; R21 and R24 in the formula may form a five member or six member ring of a substituent or un-substituent alicyclic. In addition, there is no chance of forming two or more rings in a molecule.)

Although examples of the β-diketone compound will be shown by the following formulae (75) to (91), these are illustrations and do not limit the compound.

[Chemical formulae 22-1]

(75)
$$CH_3CO-CH_2-COCH_3$$

(76)
$$CH_3CH_2CO-CH_2-COCH_3$$

(77)
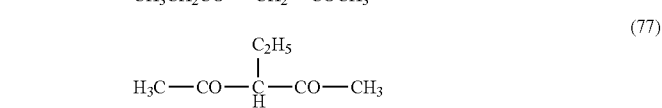

(78)
$$(CH_3)_3C-CO-CH_2-CO-C(CH_3)_3$$

(79)
$$(CH_3)_2CH-CO-CH_2-CO-CH(CH_3)_2$$

(80)
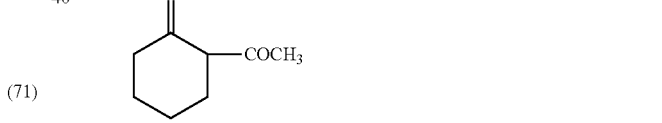

(81)
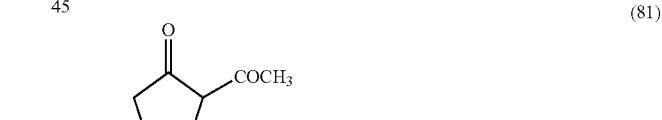

(82)
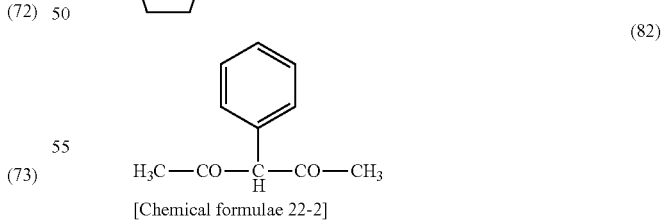

[Chemical formulae 22-2]

(83)
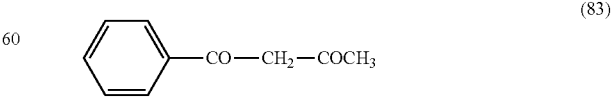

(84)
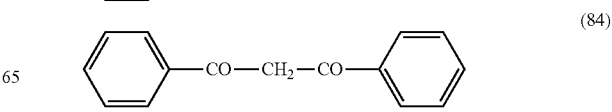

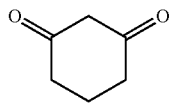
(85)

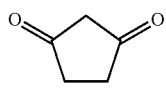
(86)

CH₃—CO—CH—CO—CH₃ (87)
    |
    CH₃

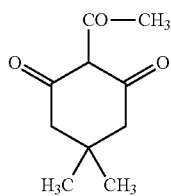
(88)

CH₃CO—CH₂—COCF₃ (89)

[Chemical formulae 22-3]

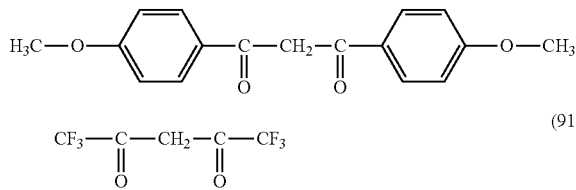
(90)

CF₃—C—CH₂—C—CF₃ (91)
  ‖   ‖
  O   O

The compound having the general formula represented by the following formula (92) may further be added to the electrochromic composition 52 as a compound having a function of suppressing deterioration of the display quality of the electrochromic display device 100 in association with the repetition operations of coloring and color erasing of the leuco dye 52a.

[Chemical formula 23]

$$R19—M_2—R21$$
$$\overset{|}{\underset{}{}}$$
(with R20 above M₂)  (92)

(In the formula, $M_2$ denotes the atoms in the 15$^{th}$ group of the periodic table except the nitrogen atom. R19, R20, and R21 in the formula denote an aryl group having a substituent group or an aryl group having no substituent group, and the aryl groups denoted by R19, R20, and R21 may be the same as each other or may be different from each other.)

Although the following formulae (93) to (99) express the examples of the compounds each having the general formula represented by the aforesaid formula (92), these are illustrations and do not limit the compounds.

[Chemical formulae 24-1]

(93) (Ph)₃—Sb

(94) (o-tolyl)₃—Sb

(95) (Ph)₃—P

(96) (o-tolyl)₃—P

(97) (Ph)₃—As

[Chemical formulae 24-2]

(98) (3,5-dimethylphenyl)₃—As

(99) (Ph)₃—Bi

It is preferable that the additive quantity of the compound having the general formula represented by the aforesaid formula (92) is within a range of from 1% by weight to 50% by weight of the contained quantity of the leuco dye 52a, and it is more preferable that the additive quantity is within a range of from 10% by weight to 50% by weight for the sufficient fulfillment of the aforesaid function.

The polymer compounds to be added to the electrochromic composition 52 each have a function of heightening the viscosity of the electrochromic composition 52 to make the handling thereof easy. One of the various polymer compounds may separately be used, and two or more types of the polymer compounds may suitably be combined to each other to be used.

Although the polymer compounds are used for heightening the viscosity of the electrochromic composition 52, the properties of the electrochromic composition 52 in this case can be a liquid having low viscosity, a paste having high viscosity, or a gel having little fluidity.

It is preferable to set the blending quantity of the polymer compounds to be within a range of from 0.1% by weight to 80% by weight of the whole weight of the electrochromic composition 52.

In the following, examples of suitable polymer compounds will be shown, but these are illustrations and do not limit the polymer compounds.

As concrete examples of the polymer compounds, for example, polyvinylidene fluoride; polyvinylidene chloride; a polymer molecule having a repeat unit of a polyalkylene oxide, such as polyethylene oxide, polyalkylene imine, or polyalkylene sulfide; polymethyl methacrylate; polyacrylonitrile; polycarbonate; and a polyvinyl formal, such as polyvinyl butyral can be given. As particularly preferable polymer compounds, polyvinyl butyral and polyvinylidene fluoride can be given.

The absorbent 53 added to the electrochromic composition 52 is, for example, aluminum oxide and/or aluminum hydroxide.

Although the mode of the addition of the absorbent 53 (aluminum oxide and/or aluminum hydroxide) is not particularly limited, it is preferable to add the absorbent 53 to the electrochromic composition 52 in the state of powder, to uniformly disperse the absorbent 53 by using an ultrasonic wave, a ball mill, or a homogenizer, such as a homomixer, and to use the absorbent 53 as a dispersion liquid of a solution of the electrochromic composition 52.

The additive quantity of the absorbent 53 varies according to the activity ratios, the particle diameters, and the like of the aluminum oxide and/or the aluminum hydroxide to be used.

Each of an aluminum oxide having a small surface area, such as an α alumina, a large aluminum oxide having a particle diameter of 10 μm or more, an aluminum hydroxide having a small surface area, and an aluminum hydroxide having a particle diameter of 10 μm or more has a small effect of absorbing the leuco dye 52a. Accordingly, it is preferable to add 0.5 grams to 5 grams of each of these absorbents 53 to one gram of the leuco dye 52a, preferable 1 gram to 3 grams, in order to enable a sufficient absorption operation.

Furthermore, each of an aluminum oxide having a large surface area, such as γ alumina, a small aluminum oxide having a particle diameter of 1 μm or less, an aluminum hydroxide having a large surface area, and a small aluminum hydroxide having a particle diameter of 1 μm or less has a large effect of absorbing the leuco dye 52a. Consequently, the addition of 0.1 grams to 0.5 grams of each of these absorbents 53 to 1 gram of the leuco dye 52a enables a sufficient absorption operation.

Furthermore, an activated alumina and the like to be used for thin-layer chromatography enables a sufficient absorption operation by being added by the quantity of 0.1 grams to 0.5 grams to 1 gram of the leuco dye 52a even if the activated alumina is formed as large particles each having a particle diameter of several tens μm.

The absorbent 53 (aluminum oxide and/or aluminum hydroxide) to absorb the leuco dye 52a can easily be obtained as a chemical product.

In the following, examples of suitable commercially available absorbents 53 (aluminum oxides and/or aluminum hydroxides) will be shown, but these are illustrations and do not limit the absorbent 53.

As concrete examples of the commercially available absorbents 53, for example, aluminum oxide 60G Neutral for thin-layer chromatography (particle diameters: 4 μm to 50 μm), manufactured by Merck Co.; low soda alumina LS235 (particle diameters: 0.47 μm), activated alumina C200 (particle diameters: 4.4 μm), aluminum hydroxide B1403 (particle diameters: 1.5 μm), manufactured by Nippon Light Metal Co., Ltd.; and γ alumina KC501 (particle diameters: 1 μm), manufactured by Sumitomo Chemical Co., Ltd. can be given.

The electrochromic compositions 52 mentioned above are examples. As long as a composition other than the aforesaid electrochromic compositions 52 can perform electrochemical coloring, the composition to be contained in the porous body 51 can be used for the electrochromic composition layer 50.

<Manufacturing Method of Electrochromic Display Device>

A manufacturing method of the electrochromic display device 100 includes the following processes [1]-[6].

[1] First Substrate Preparation Process

The first substrate preparation process is a process of preparing the first substrate 10.

[2] First Evaporation Process

The first evaporation process is a process of providing the first electrodes 20 . . . on one surface of the first substrate 10. The first electrodes 20 . . . are formed as films by using a publicly known evaporation method, a plating method, a sputtering method, or the like, then, patterned by the photolithographic method, and further, formed in stripes by the etching method.

[3] Second Substrate Preparation Process

The second substrate preparation process is a process of preparing the second substrate 30.

[4] Second Evaporation Process

The second evaporation process is a process of providing the second electrodes 40 . . . on one surface of the second substrate 30. The second electrodes 40 . . . are formed as films by the publicly known evaporation method, the plating method, the sputtering method, or the like, then, patterned by the photolithographic method, and further, formed in stripes by the etching method.

[5] Porous Body Set Process

The porous body set process is a process of setting the porous body 51 between the first substrate 10, on which the first electrodes 20 . . . are formed, and the second substrate 30, on which the second electrodes 40 . . . are formed.

To put it concretely, for example, the porous body 51 is formed by inserting one of the aforesaid materials (for example, the nylon net filter manufactured by Millopore Co. (thickness: 55 μm; apertures: 11 μm)) between the first substrate 10, on which the first electrodes 20 . . . are formed, and the second substrate 30, on which the second electrodes 40 . . . are formed.

Alternatively, for example, the porous body 51 is set by performing screen printing on a surface of the first substrate 10 on which the first electrodes 20 . . . are formed and/or a surface of the second substrate on which the second electrodes 40 . . . are formed with a glass paste (for example, glass paste PLS-3124, manufactured by Nippon Electric Glass Co., Ltd.) or the like.

Alternatively, for example, the porous body 51 is formed and set by giving, for example, MEMS permanent resist TMMRS-2000, manufactured by Tokyo Ohka Kogyo Co., Ltd., on the surface of the first substrate 10 on which the first electrodes 20 . . . are formed and/or the surface of the second substrate 30 on which the second electrodes 40 . . . are formed with a spinner or the like, and next, by three-dimensionally forming the resist into a pattern by the photolithographic method using a predetermined mask.

[6] Pasting Process

The pasting process is a process of pasting the first substrate 10, on which the first electrodes 20 . . . are formed, and the second substrate 30, on which the second electrodes 40 . . . are formed, together, with the electrodes situated on the inside to enclose the electrochromic composition 52, to which predetermined additives (absorbents 53, polymer compounds, and the like) are added.

To put it concretely, for example, the electrochromic composition 52 to which a predetermined additive is added is impregnated into the porous body 51 to form the electrochromic composition layer 50, and the first substrate 10, on which the first electrodes 20 . . . are formed, and the second substrate 30, on which the second electrodes 40 . . . are formed, are pasted on both the surfaces of the electrochromic composition layer 50, respectively.

Alternatively, for example, the electrochromic composition layer 50 is formed by impregnating the electrochromic composition 52 to which a predetermined additive is added into the porous body 51 set on one substrate (for example, the first substrate 10, on which the first electrodes 20 . . . are formed), and the other substrate (for example, the second substrate 30, on which the second electrodes 40 . . . are formed) is pasted on the electrochromic composition layer 50.

Alternatively, for example, the first substrate 10, on which the first electrodes 20 . . . are formed, and the second substrate 30, on which the second electrodes 40 . . . are formed, are pasted together with the porous body 51 set, and the electrochromic composition 52, to which predetermined additives are added, is injected into the air gaps between the two substrates between which porous body 51 is set with a pipet or the like.

Alternatively, for example, first substrate 10, on which the first electrodes 20 . . . are formed, and the second substrate 30, on which the second electrodes 40 . . . are formed are pasted together with the porous body 51 set, and glass capillaries or the like have separately been formed beforehand in the air gaps between the two substrates between which the porous body 51 is set. Then, the electrochromic composition 52 to which predetermined additives are added is enclosed in the porous body 51 by absorbing the electrochromic composition 52 into the porous body 51 using the glass capillaries or the like.

The manufacturing method of the aforesaid electrochromic display device 100 is an example, and the manufacturing method is not limited to the one described above.

<Drive Method of Electrochromic Display Device>

The electrochromic display device 100 is driven by, for example, the passive matrix drive as described in the following.

Each of the pixels 60 of the electrochromic display device 100 is configured of the electrochromic composition layer 50 put between the first electrodes 20 . . . and the second electrodes 40 . . . .

The coloring of the electrochromic display device 100 is performed by causing an electrochemical change of the electrochromic composition 52 on the interfaces (surfaces of second electrodes 40 . . . ) between the electrochromic composition layer 50 and the second electrodes 40 . . . when a current is passed through the electrochromic composition 52 by applying a current between the first electrodes 20 . . . and the second electrodes 40 . . . . Furthermore, the color erasing of the electrochromic display device 100 is performed by applying a current in the direction opposite to the direction for coloring, or by blocking the passage of the current for coloring and leaving it as it is. The application of a current in the direction opposite to the direction for coloring can more rapidly execute the erasing operation.

The color optical density of the electrochromic display device 100 can arbitrarily be adjusted depending on the quantity of electricity to be turned on (quantity of a current to be applied). Furthermore, an application of a current can be performed by continuous supply of a current, or by intermittent supply of a current. The intermittent supply of a current indicates, for example, a drive by a pulse. On the other hand, the coloring of the electrochromic display device 100 is also erased by blocking the passage of a current, but it is needed to keep the coloring of electrochromic display device 100 when it is used as a sheet of electronic paper. The keeping of a display of the electrochromic display device 100 can be performed by, for example, supplying a current smaller than the current supplied for executing the display of the display device 100. For example, in the case of supplying a continuous current, the keeping of coloring can be performed by a voltage or a current that is a half or less of the voltage or the current at the time of coloring. Furthermore, in the case of supplying an intermittent current, that is, generating a pulse drive, the keeping of coloring can be performed by, for example, making the period of applying a current shorter than that at the time of coloring, or making the intensity, the width, or the interval of the pulse smaller than those at the time of coloring.

Here, if the electrochromic composition 52 is introduced into the pores 51*a* . . . of the porous body 51, the deterioration of the display performance owing to the crosstalk between the pixels 60, 60 of the display device is suppressed, and the display device is led to have a memory function of a display.

Figure 3:
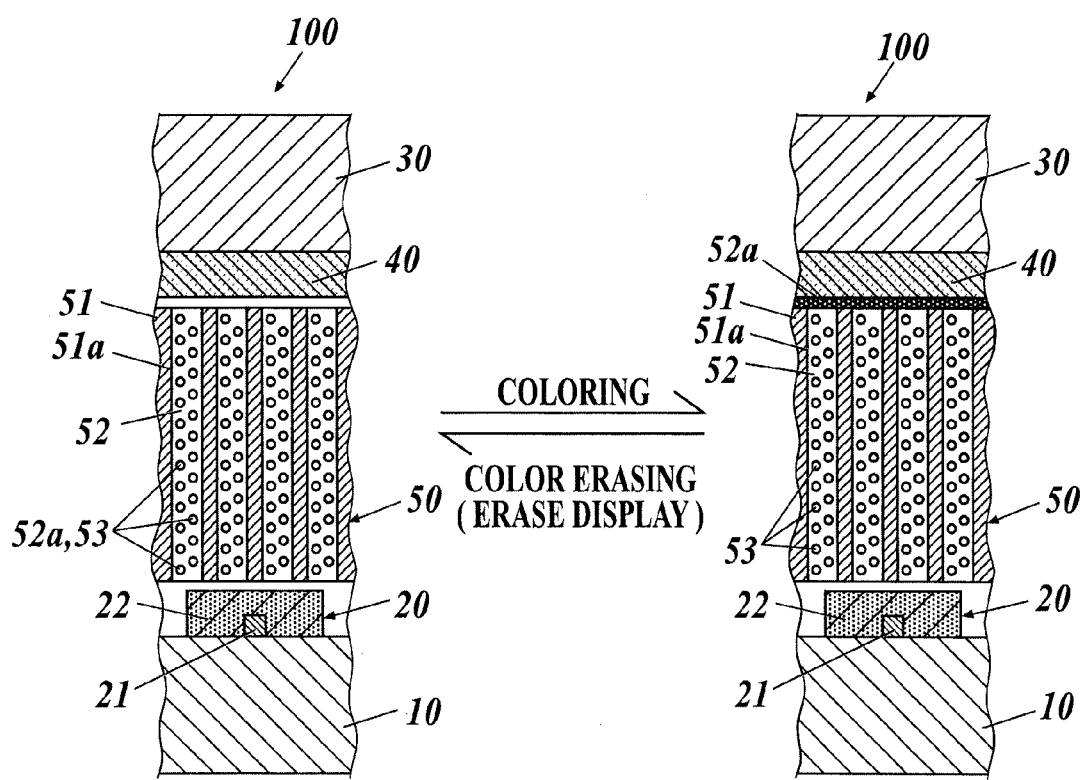
FIG. 3 is a view for describing coloring of an electrochromic composition.

To put it concretely, if the electrochromic composition 52 is impregnated into the porous body 51 to be introduced into the pores 51*a* . . . of the porous body 51, then the leuco dye 52*a* in the electrochromic composition 52, for example, as shown in FIG. 3, moves from the insides of the pores 51*a* . . . of the porous body 51 to the display region of the interface (the surfaces of the second electrodes 40 . . . ) between the electrochromic composition layer 50 and the second electrodes 40 . . . to color, and the leuco dye 52*a* moves from the interface (the surface of the second electrodes 40 . . . ) between the electrochromic composition layer 50 and the second electrodes 40 . . . to the insides of the pores 51*a* . . . of the porous body 51 to erase the coloring. Accordingly, in the present invention, because the separations of the leuco dye 52*a* from the surfaces of the second electrodes 40 . . . cannot be achieved unless the leuco dye 52*a* moves to the insides of the pores 51*a* . . . of the porous body 51, it takes a longer time for the leuco dye 52*a* in the present invention to be separated from the surfaces of the second electrodes 40 . . . in comparison with the leuco dye 52*a* of a display that does not use the porous body 51.

Accordingly, in order to immediately separate the leuco dye 52*a* from the surfaces of the second electrodes 40 . . . to erase coloring, it is needed to apply a current in the direction opposite to the direction of the current to be applied for coloring.

In a conventional display device using the electrochromic composition 52 to which the absorbent 53 (aluminum oxide and/or aluminum hydroxide) is not added, it is necessary to strictly control the quantity of a current to be applied in applying the current for executing the erasing. The reason is that the leuco dye 52*a* moves to the interface (the surfaces of the first electrodes 20 . . . ) between the electrochromic composition layer 50 and the first electrodes 20 . . . and colors by applying a current for executing the erasing, and as a result, displays are sometimes not erased.

On the other hand, in the electrochromic display device 100 of the present invention, because the leuco dye 52*a* is absorbed by the absorbent 53 (aluminum oxide and/or aluminum hydroxide) at the time of applying a current for executing the erasing without strictly controlling the quantity of a current to be applied in applying the current for executing the erasing unlike the conventional display device, it is possible to prevent the leuco dye 52*a* from moving to the interface (the surfaces of the first electrodes 20 . . . ) between the electrochromic composition layer 50 and the first electrodes 20 . . . and from coloring.

To put it concretely, the leuco dye 52a polarizes in the solution. The absorbent 53 (aluminum oxide and/or aluminum hydroxide) has a feature of having a large specific surface area and a high absorption ability, and the surface of the absorbent 53 is polarized. Because the second electrodes 40 . . . are charged to be positive in applying a current for executing a display of coloring, the leuco dye 52a, which is an electron donative, gives electrons to the second electrodes 40 . . . to color, and performs a display. On the other hand, in applying a current for executing the erasing, the second electrodes 40 . . . are charged to be negative because a current is applied in the direction opposite to the direction at the time of coloring. The leuco dye 52a receives electrons from the negatively charged second electrodes 40 . . . to erase coloring, and then the coloring is erased. Then, the leuco dye 52a, which has changed to be colorless, moves into the direction of the first electrodes 20 . . . , but the leuco dye 52a does not arrive at the first electrodes 20 . . . owing to the existence of the absorbent 53 having a high absorption ability and a polarized surface. Then, the leuco dye 52a moves to the absorbent 53, and is trapped and absorbed by the absorbent 53. Consequently, in the electrochromic display device 100 of the present invention, it is possible to prevent the leuco dye 52a from moving to the interface (the surfaces of the first electrodes 20 . . . ) between the electrochromic composition layer 50 and the first electrodes 20 . . . and from coloring, at the time of applying a current for executing the erasing.

EXAMPLES

In the following, the present invention will further minutely be described by means of concrete examples, but the present invention is not limited to these examples.

Example 1

(Production of Electrochromic Display Device)

A rectangular alkali-free glass substrate having a thickness of 0.7 mm was used as the first substrate 10. Chromium was deposited on one surface (upper surface) of the alkali-free glass substrate to be a thickness of 10 nm. Gold was deposited on the chromium to be a thickness of 120 nm. Chromium was deposited on the gold to be a thickness of 10 nm. Thus, a metal film was formed. The metal film formed by the depositions was subjected to patterning by the photolithographic method to be formed in stripes, the width of each of the stripes being 0.025 mm and the pitches 0.45 mm. Thus, the metal electrode portions 21 were formed.

Next, ITO films were formed by sputtering on the metal electrode portions 21. The ITO films formed by sputtering each had a film thickness of 150 nm. The ITO films formed by sputtering were patterned into stripes, the width of each of the stripes being 0.42 mm and the pitches 0.45 mm, by the photolithographic method, with the position of each of the stripes adjusted to be parallel to each of the metal electrode portions 21 and adjusted so that the metal electrode portions 21 might not be exposed. Thereby, the transparent electrode portions 22 were formed, and the first electrodes 20 . . . were formed.

A rectangular alkali-free glass substrate having a thickness of 0.7 mm was used as the second substrate 30. An ITO film was formed on one surface (undersurface) of the alkali-free glass substrate by sputtering. The ITO film formed by the sputtering had a film thickness of 200 nm. The ITO film formed by the sputtering was patterned by the photolithographic method into stripes, the widths of each stripes being 0.42 mm and the pitches 0.45 mm. Thus, the second electrodes 40 . . . were formed.

The numbers of the lines of the formed first electrodes 20 . . . and the second electrodes 40 . . . were 128, respectively.

Next, rectangular PETEX (polyester mesh cloth) PET 51HC, manufactured by Sefar Inc., was put between the first electrodes 20 . . . and the second electrodes 40 . . . as the porous body 51. The first electrodes 20 . . . were overlapped over the second electrodes 40 . . . to be perpendicular to the second electrodes 40 . . . . Then, the first electrodes 20 . . . and the second electrodes 40 . . . were adjusted in order that their orthogonal parts might be the pixels 60 . . . . Three side surfaces (surfaces parallel to the thickness direction) of the four side surfaces were adhered with an adhesive (for example, a thermosetting epoxy resin), and the porous body 51 was sealed.

Next, the electrochromic composition 52 (hereinafter referred to as "electrochromic composition A") to which predetermined additives (the absorbent 53, polymer compounds, or the like) were added was injected from the part where no adhesives were adhered with a pipet, and the part where no adhesives were adhered among the four side surfaces (parallel to the thickness direction) was adhered with an adhesive to be sealed. Then, a white PET sheet having a thickness of 200 μm was stuck on the undersurface of the first substrate 10, and thus the electrochromic display device 100 (in the following, referred to as "display device A") was produced.

For comparison, electrochromic composition not containing any ferrocene derivatives among the display quality deterioration suppression agents, an electrochromic composition not containing any compounds each having a carbonyl group among the display quality deterioration suppression agents, an electrochromic composition not containing any hydroquinone derivatives and any catechol derivatives among the display quality deterioration suppression agents, and an electrochromic composition not containing any display quality deterioration suppression agents were prepared, and electrochromic display devices were produced by using the respective electrochromic compositions similarly to the display device A.

Hereinafter the electrochromic composition not containing any ferrocene derivatives among the display quality deterioration suppression agents will be referred to as an "electrochromic composition B" and "electrochromic composition C." An electrochromic display device equipped with the electrochromic composition B will be referred to as a "display device B," and an electrochromic display device equipped with the electrochromic composition C will be referred to as a "display device C."

Furthermore, the electrochromic composition not containing any compounds each having a carbonyl group among the display quality deterioration suppression agents will be referred to as an "electrochromic composition D." An electrochromic display device equipped with the electrochromic composition D will be referred to as a "display device D."

Furthermore, the electrochromic composition not containing any hydroquinone derivatives and any catechol derivatives among the display quality deterioration suppression agents will be referred to as an "electrochromic composition E." An electrochromic display device equipped with the electrochromic composition E will be referred to as a "display device E."

Furthermore, the electrochromic composition not containing any display quality deterioration suppression agents will be referred to as an "electrochromic composition F." An electrochromic display device equipped with the electrochromic composition F will be referred to as a "display device F."

The composition of each of the electrochromic composition A is:
- 300 mg of a leuco dye (aforesaid formula (16));
- 56 mg of a hydroquinone derivative (aforesaid formula (19): hydroquinone);
- 15 mg of a ferrocene derivative (aforesaid formula (35): ferrocene);
- 106 mg of a compound having a carbonyl group (dibenzoyl derivative α-diketone compound) (aforesaid formula (57): dibenzoyl));
- 100 mg of a compound having the general formula represented by the aforesaid formula (2) ((n-$C_4H_9$)$_4$N$BF_4$);
- 1.0 g of a polar solvent (N,N-dimethylacetamide);
- 25 mg of a polymer compound (polyvinyl butyral: S-LEC BH3, manufactured by Sekisui Chemical Co., Ltd.); and
- 75 mg of the absorbent 53 (aluminum oxide: activated alumina C200, manufactured by Nippon Light Metal Co., Ltd.).

The composition of the electrochromic composition B is:
- 300 mg of a leuco dye (aforesaid formula (16));
- 56 mg of a hydroquinone derivative (aforesaid formula (19): hydroquinone);
- 43 mg of a compound having a carbonyl group (acetophenone derivative (aforesaid formula (46): diacetylbenzene));
- 100 mg of a compound having the general formula represented by the aforesaid formula (2) ((n-$C_4H_9$)$_4$N$BF_4$);
- 1.0 g of a polar solvent (N,N-dimethylacetamide);
- 25 mg of a polymer compound (polyvinyl butyral: S-LEC BH3, manufactured by Sekisui Chemical Co., Ltd.); and
- 75 mg of the absorbent 53 (aluminum oxide: activated alumina C200, manufactured by Nippon Light Metal Co., Ltd.).

The composition of the electrochromic composition C is:
- 300 mg of a leuco dye (aforesaid formula (16));
- 56 mg of a hydroquinone derivative (aforesaid formula (19): hydroquinone);
- 106 mg of a compound having a carbonyl group (dibenzoyl derivative α-diketone compound) (aforesaid formula (57): dibenzoyl));
- 100 mg of a compound having the general formula represented by the aforesaid formula (2) ((n-$C_4H_9$)$_4$N$BF_4$);
- 1.0 g of a polar solvent (N,N-dimethylacetamide);
- 25 mg of a polymer compound (polyvinyl butyral: S-LEC BH3, manufactured by Sekisui Chemical Co., Ltd.); and
- 75 mg of the absorbent 53 (aluminum oxide: activated alumina C200, manufactured by Nippon Light Metal Co., Ltd.).

The composition of the electrochromic composition D is:
- 300 mg of a leuco dye (aforesaid formula (16));
- 56 mg of a hydroquinone derivative (aforesaid formula (19): hydroquinone);
- 15 mg of a ferrocene derivative (aforesaid formula (35): ferrocene);
- 100 mg of a compound having the general formula represented by the aforesaid formula (2) ((n-$C_4H_9$)$_4$N$BF_4$);
- 1.0 g of a polar solvent (N,N-dimethylacetamide);
- 25 mg of a polymer compound (polyvinyl butyral: S-LEC BH3, manufactured by Sekisui Chemical Co., Ltd.); and
- 75 mg of the absorbent 53 (aluminum oxide: activated alumina C200, manufactured by Nippon Light Metal Co., Ltd.).

The composition of the electrochromic composition E is:
- 400 mg of a leuco dye (aforesaid formula (16));
- 20 mg of a ferrocene derivative (aforesaid formula (35): ferrocene);
- 140 mg of a compound having a carbonyl group (dibenzoyl derivative α-diketone compound) (aforesaid formula (57): dibenzoyl));
- 130 mg of a compound having the general formula represented by the aforesaid formula (2) ((n-$C_4H_9$)$_4$N$BF_4$);
- 1.0 g of a polar solvent (N,N-dimethylacetamide);
- 25 mg of a polymer compound (polyvinyl butyral: S-LEC BH3, manufactured by Sekisui Chemical Co., Ltd.); and
- 75 mg of the absorbent 53 (aluminum oxide: activated alumina C200, manufactured by Nippon Light Metal Co., Ltd.).

The composition of the electrochromic composition F is:
- 300 mg of a leuco dye (aforesaid formula (16));
- 30 mg of a compound having the general formula represented by the aforesaid formula (2) ((n-$C_4H_9$)$_4$N$BF_4$);
- 1.0 g of a polar solvent (N,N-dimethylacetamide);
- 25 mg of a polymer compound (polyvinyl butyral: S-LEC BH3, manufactured by Sekisui Chemical Co., Ltd.); and
- 75 mg of the absorbent 53 (aluminum oxide: activated alumina C200, manufactured by Nippon Light Metal Co., Ltd.).

(Display Operation)

A pattern producing circuit was connected to each of the display devices A-F. Then, a voltage of 2.0 V was applied to each of the display devices A-F at a speed of 30 msec per line, and binary display patterns were formed by passive matrix drive displays. That is, a black pattern was obtained by making each of the display devices A-F generate a black pigment around the surface parts of the second electrodes 40 . . . at the parts (pixels 60) where the first electrodes 20 . . . and the second electrodes 40 . . . intersected with each other by a drive of a passive matrix circuit.

(Erasing Operation)

The voltage application (an application of a current) to each of the display devices A-F displaying a black pattern was stopped, and an application of a current (an application of a current for executing the erasing) was performed to each of the display devices A-F in the direction opposite to the direction for executing a display. To put it concretely, a voltage of 2.0 V was applied to each of the display devices A-F at a speed of 100 msec per line.

The displayed black patterns could be erased by the application of a current for executing the erasing in any of the display devices A-F.

(Display-Erasing Operations)

The aforesaid display operation of each of the display devices A-F was executed, and after that, the aforesaid erasing operation was executed. Then, the display operation and the erasing operation were repeatedly performed.

When 50 times or more of display operations and erasing operations of the display device F (the electrochromic display device equipped with the electrochromic composition not containing any display quality deterioration suppression agents) were repeatedly performed, then color changing of the ground color to yellow gradually advanced, and display density gradually lowered. Then, after the repetitions of 100 times or more, the remarkable deterioration of the contrast ratio was caused.

On the other hand, in the display devices A-E, even when 1000 times of repetitions of display operations and erasing operations were performed, no lowering of their display density was caused, and almost the same display performance as that at the first time of the repetition times can be held. In addition, no color changes of the ground color were found.

From the results mentioned above, it was found that the repetition stability of an electrochromic display device was improved by making an electrochromic composition contain at least any of three kinds of display quality deterioration suppression compounds (a first display quality deterioration suppression compound (a hydroquinone derivative and/or a catechol derivative), a second display quality deterioration suppression compound (a ferrocene derivative) and a third display quality deterioration suppression compound (a compound having a carbonyl group)).

When the further display operations and the erasing operations of the display device E (an electrochromic display device equipped with an electrochromic composition not containing any hydroquinone derivatives and catechol derivatives) were repeatedly performed, the display density of the display device E gradually lowered, and the display performance thereof deteriorated. At the time point when the repetition times exceeded 5000 times, the display operation of the display device E became almost impossible.

Furthermore, when the further display operations and the erasing operations of the display device D (an electrochromic display device equipped with an electrochromic composition not containing any carbonyl groups) were repeatedly performed, the erasing performance of the display device D deteriorated. At the time point when the repetition times exceeded 8000 times, the erasing operation of the display device D became almost impossible.

On the other hand, even when the display operations and the erasing operations of the display devices A-C were repeated by 5000 times, no deterioration of their display performances and erasing performances, and no color changes of their ground colors were found.

Even when the further display operations and erasing operations of the display devices B and C (electrochromic display devices equipped with electrochromic composition not containing any ferrocene derivatives) were repeatedly performed, no changes of their display performances and erasing performances were found, and good display operations and erasing operations were shown. However, their ground colors began to change from light yellow to light brown when the number of repletion times is 50000 times, and their ground colors changed to light brown when the number of repetition times is 200000 times.

On the other hand, even when the display operations and the erasing operations of the display device A were repeated by 200000 times, no deterioration of the display performance and the erasing performance thereof and no color changes of the ground color thereof were found, and almost the same performances at the first time of the number of repetition times could be held.

That is, in the display device A, even when the same pattern had been written and erased by 100000 times or more, the pattern could completely be erased by an erasing operation, and further, a display could be formed at a high contrast ratio without producing a coloration of the ground color (non-display parts).

From the results mentioned above, it was found that the repetition stability of an electrochromic display device was further improved by making an electrochromic composition contain all of the three kinds of display quality deterioration suppression compounds (the first display quality deterioration suppression compound (the hydroquinone derivative and/or the catechol derivative), the second display quality deterioration suppression compound (the ferrocene derivative) and the third display quality deterioration suppression compound (the compound having the carbonyl group)).

Example 2

(Production of Electrochromic Display Device)

In order to evaluate the display performances of display devices with a spectrophotometer, in an example 2, an electrochromic display device was produced by using an ITO electrode formed on almost the whole surface of one surface of the first substrate 10 in place of the first electrodes 20 . . . , an ITO electrode formed on almost the whole surface of one surface of the second substrate 30 in place of the second electrodes 40 . . . , and a spacer for holding a certain volume of the electrochromic composition 52 between the first substrate 10 and the second substrate 30 in place of the porous body 51, without adding the absorbent 53 to the electrochromic composition 52.

To put it concretely, a rectangular alkali-free glass substrate was used as the first substrate 10, and an ITO electrode (hereinafter referred to as a "first ITO electrode") was formed by forming ITO with sputtering on almost the whole surface of one surface (upper surface) of the substrate.

A rectangular alkali-free glass substrate was used as the second substrate 30, and an ITO electrode (hereinafter referred to as a "second ITO electrode") was formed by forming ITO with sputtering on almost the whole surface of one surface (undersurface) of the substrate.

Next, a spacer (PET space (thickness: 100 μm)) was put between the first ITO electrode and the second ITO electrode in order that the coloring area might be about 1 cm$^2$, and the first substrate 10 and the second substrate 30 were overlapped. Then, three side surfaces of the four (surfaces parallel to the thickness direction) were adhered with an adhesive (for example, a thermosetting epoxy resin) to seal them.

Next, the electrochromic composition 52 (hereinafter referred to as an "electrochromic composition G") to which a predetermined additive (a polymer compound or the like) was added was injected from the part where no adhesives were adhered with a pipet, and the part where no adhesives were adhered among the four side surfaces (parallel to the thickness direction) was adhered with an adhesive to be sealed. Thus the electrochromic display device 100 (hereinafter referred to as a "display device G") was produced.

For comparison, an electrochromic composition not containing the second display quality deterioration suppression compound (ferrocene derivative), an electrochromic composition not containing the third display quality deterioration suppression compound (a compound having a carbonyl group), an electrochromic composition not containing the first display quality deterioration suppression compound (hydroquinone derivative and/or catechol derivative), and an electrochromic composition not containing any of the first to third display quality deterioration suppression agents were prepared, and electrochromic display devices were produced by using the respective electrochromic compositions similarly to the display device G.

In the following, the electrochromic compositions not containing the second display quality deterioration suppression agent (ferrocene derivative) will be referred to as an "electrochromic composition H" and an "electrochromic composition I." An electrochromic display device equipped with the electrochromic composition H will be referred to as a "display device H," and an electrochromic display device equipped with the electrochromic composition I will be referred to as a "display device I."

Furthermore, the electrochromic composition not containing the third display quality deterioration suppression agent (a compound having a carbonyl group) will be referred to as an "electrochromic composition J." An electrochromic display device equipped with the electrochromic composition J will be referred to as a "display device J."

Furthermore, the electrochromic composition not containing the first display quality deterioration suppression agents (hydroquinone derivative and/or catechol derivative) will be referred to as an "electrochromic composition K." An electrochromic display device equipped with the electrochromic composition K will be referred to as a "display device K."

Furthermore, the electrochromic composition not containing the first to the third display quality deterioration suppression agents will be referred to as an "electrochromic composition L." An electrochromic display device equipped with the electrochromic composition L will be referred to as a "display device L."

The composition of the electrochromic composition G is:
- 300 mg of a leuco dye (aforesaid formula (16));
- 69 mg of a hydroquinone derivative (aforesaid formula (21): 2,6-dimethyl hydroquinone);
- 15 mg of a ferrocene derivative (aforesaid formula (35): ferrocene);
- 70 mg of a compound having a carbonyl group (β-diketone compound (aforesaid formula (80): 2-acetyl cyclohexanone));
- 100 mg of a compound having the general formula represented by the aforesaid formula (2) ((n-$C_4H_9$)$_4$N$BF_4$);
- 1.0 g of a polar solvent (N,N-dimethylacetamide); and
- 25 mg of a polymer compound (polyvinyl butyral: S-LEC BH3, manufactured by Sekisui Chemical Co., Ltd.).

The composition of the electrochromic composition H is:
- 300 mg of a leuco dye (aforesaid formula (16));
- 69 mg of a hydroquinone derivative (aforesaid formula (21): 2,6-dimethyl hydroquinone);
- 43 mg of a compound having a carbonyl group (β-diketone compound (aforesaid formula (83): benzoylacetone));
- 100 mg of a compound having the general formula represented by the aforesaid formula (2) ((n-$C_4H_9$)$_4$N$BF_4$);
- 1.0 g of a polar solvent (N,N-dimethylacetamide); and
- 25 mg of a polymer compound (polyvinyl butyral: S-LEC BH3, manufactured by Sekisui Chemical Co., Ltd.).

The composition of the electrochromic composition I is:
- 300 mg of a leuco dye (aforesaid formula (16));
- 69 mg of a hydroquinone derivative (aforesaid formula (21): 2,6-dimethyl hydroquinone);
- 70 mg of a compound having a carbonyl group (β-diketone compound (aforesaid formula (80): 2-acetylcyclohexanone));
- 100 mg of a compound having the general formula represented by the aforesaid formula (2) ((n-$C_4H_9$)$_4$N$BF_4$);
- 1.0 g of a polar solvent (N,N-dimethylacetamide); and
- 25 mg of a polymer compound (polyvinyl butyral: S-LEC BH3, manufactured by Sekisui Chemical Co., Ltd.).

The composition of the electrochromic composition J is:
- 300 mg of a leuco dye (aforesaid formula (16));
- 69 mg of a hydroquinone derivative (aforesaid formula (21): 2,6-dimethyl hydroquinone);
- 15 mg of a ferrocene derivative (aforesaid formula (35): ferrocene);
- 100 mg of a compound having the general formula represented by the aforesaid formula (2) ((n-$C_4H_9$)$_4$N$BF_4$);
- 1.0 g of a polar solvent (N,N-dimethylacetamide); and
- 25 mg of a polymer compound (polyvinyl butyral: S-LEC BH3, manufactured by Sekisui Chemical Co., Ltd.).

The composition of the electrochromic composition K is:
- 400 mg of a leuco dye (aforesaid formula (16));
- 15 mg of a ferrocene derivative (aforesaid formula (35): ferrocene);
- 43 mg of a compound having a carbonyl group (β-diketone compound (aforesaid formula (83): benzoylacetone));
- 130 mg of a compound having the general formula represented by the aforesaid formula (2) ((n-$C_4H_9$)$_4$N$BF_4$);
- 1.0 g of a polar solvent (N,N-dimethylacetamide); and
- 25 mg of a polymer compound (polyvinyl butyral: S-LEC BH3, manufactured by Sekisui Chemical Co., Ltd.).

The composition of the electrochromic composition L is:
- 300 mg of a leuco dye (aforesaid formula (16));
- 30 mg of a compound having the general formula represented by the aforesaid formula (2) ((n-$C_4H_9$)$_4$N$BF_4$);
- 1.0 g of a polar solvent (N,N-dimethylacetamide); and
- 25 mg of a polymer compound (polyvinyl butyral: S-LEC BH3, manufactured by Sekisui Chemical Co., Ltd.).

(Display Operation)

Each of the display devices G-L was repeatedly operated by receiving the alternate applications of a voltage of +2.0 V and a voltage of −2.0 V at a period of 0.7 seconds, which voltages were generated by a voltage generation device using a triangular wave. On the way of the repetition operation, a current of 3 mA was suitably supplied to each of the display devices G-L for 5 seconds, and the color optical densities at that time were measured with a spectrophotometer (U-3310, manufactured by Hitachi Ltd.).

Figure 4:
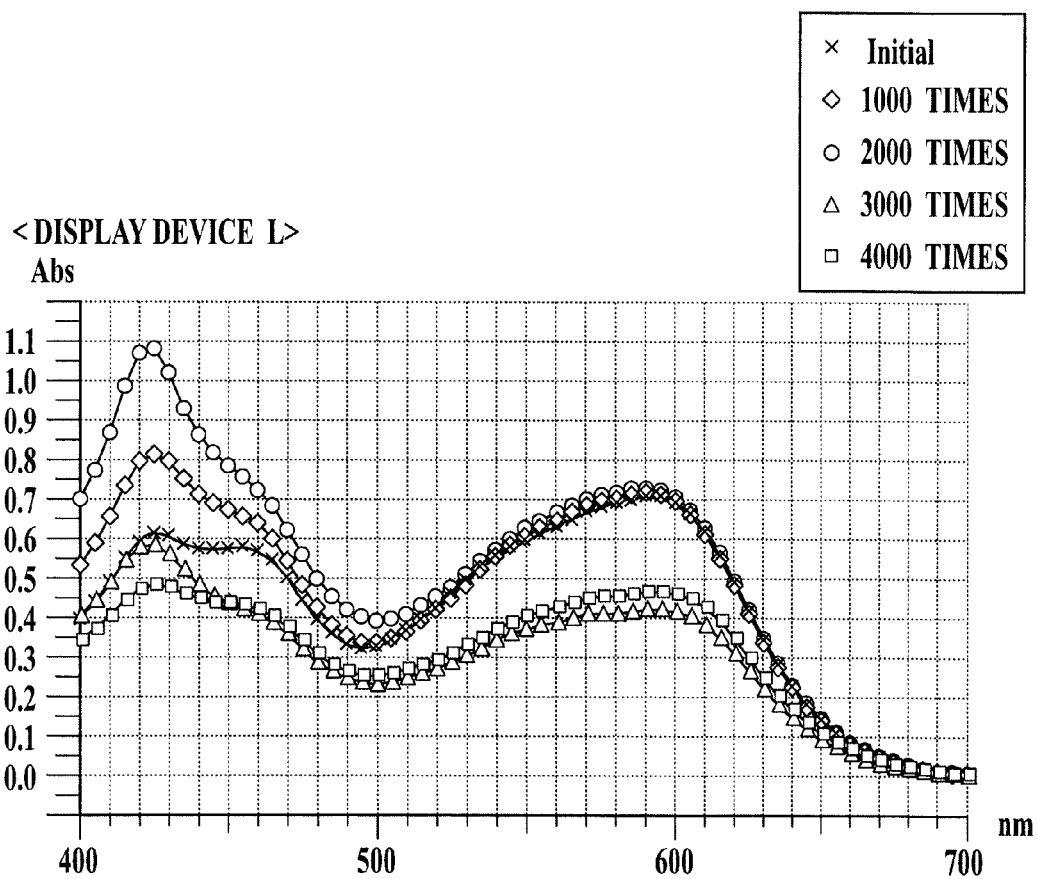
FIG. 4 is a diagram showing color optical density measurement results of a display device L (an electrochromic display device containing an electrochromic compound without a first to a third display quality deterioration suppression agents)

In the display device L (the electrochromic display device equipped with the electrochromic composition not containing the first to the third display quality deterioration suppression agents), as shown in FIG. 4, as the number of times of the operations increases to 1000, 2000 and so forth, the color change of the ground color to yellow advanced, and the color optical density heightened by the color change. Furthermore, when the operations were repeatedly performed, the color optical density lowered.

Figure 5:
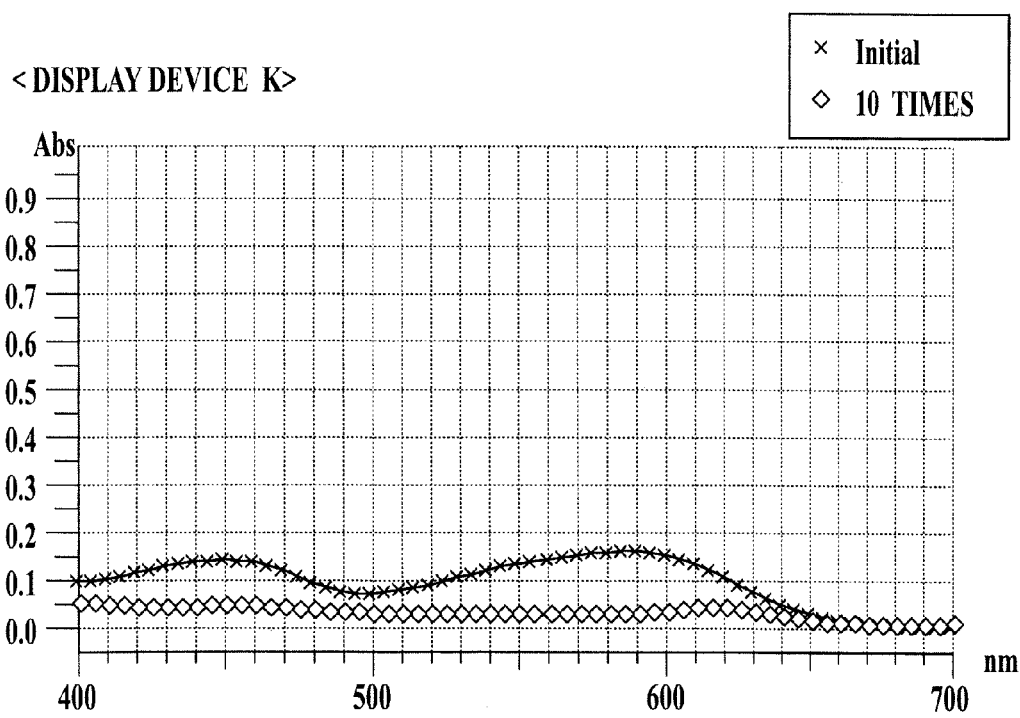
FIG. 5 is a diagram showing color optical density measurement results of a display device K (an electrochromic display device containing an electrochromic composition without a first display quality deterioration suppression compound (a hydroquinone derivative and/or a catechol derivative))

In the display device K (the electrochromic display device equipped with the electrochromic composition not containing the first display quality deterioration suppression compound (hydroquinone derivative and/or catechol derivative)), as shown in FIG. 5, its color optical density was low from the beginning, and the display device K fell into a state of hardly coloring after the operations of 10 times.

Figure 6:
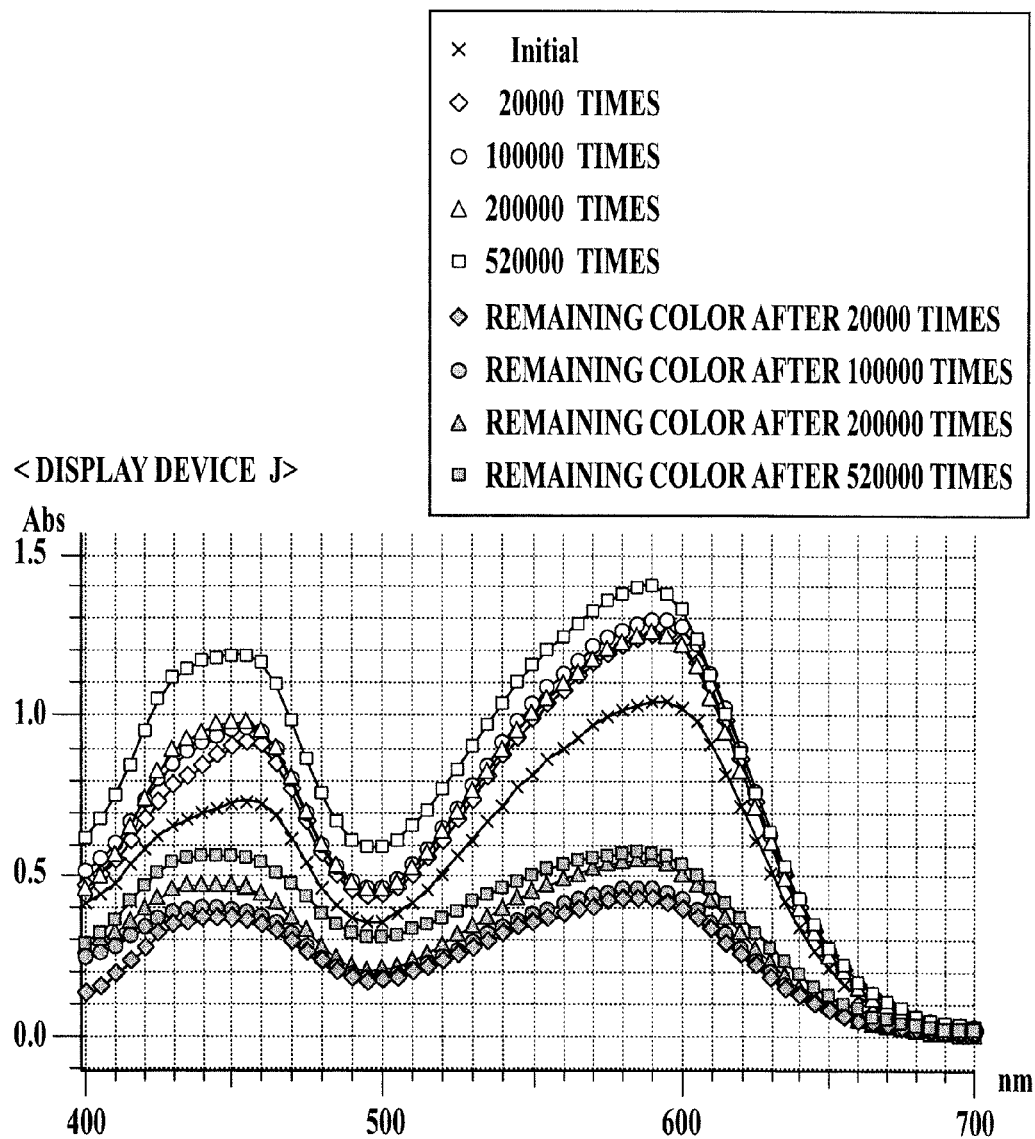
FIG. 6 is a diagram showing color optical density measurement results of a display device J (an electrochromic display device containing an electrochromic composition without a third display quality deterioration suppression compound (a compound having a carbonyl group))

In the display device J (the electrochromic display device equipped with the electrochromic composition not containing the third display quality deterioration suppression compound (a compound having a carbonyl group)), as shown in FIG. 6, its color optical density did not lower even when the repetition operations were performed by 520000 times, but as the number of times of operations increased, color remaining became denser, and its color optical density heightened by the color remaining quantity.

Figure 7:
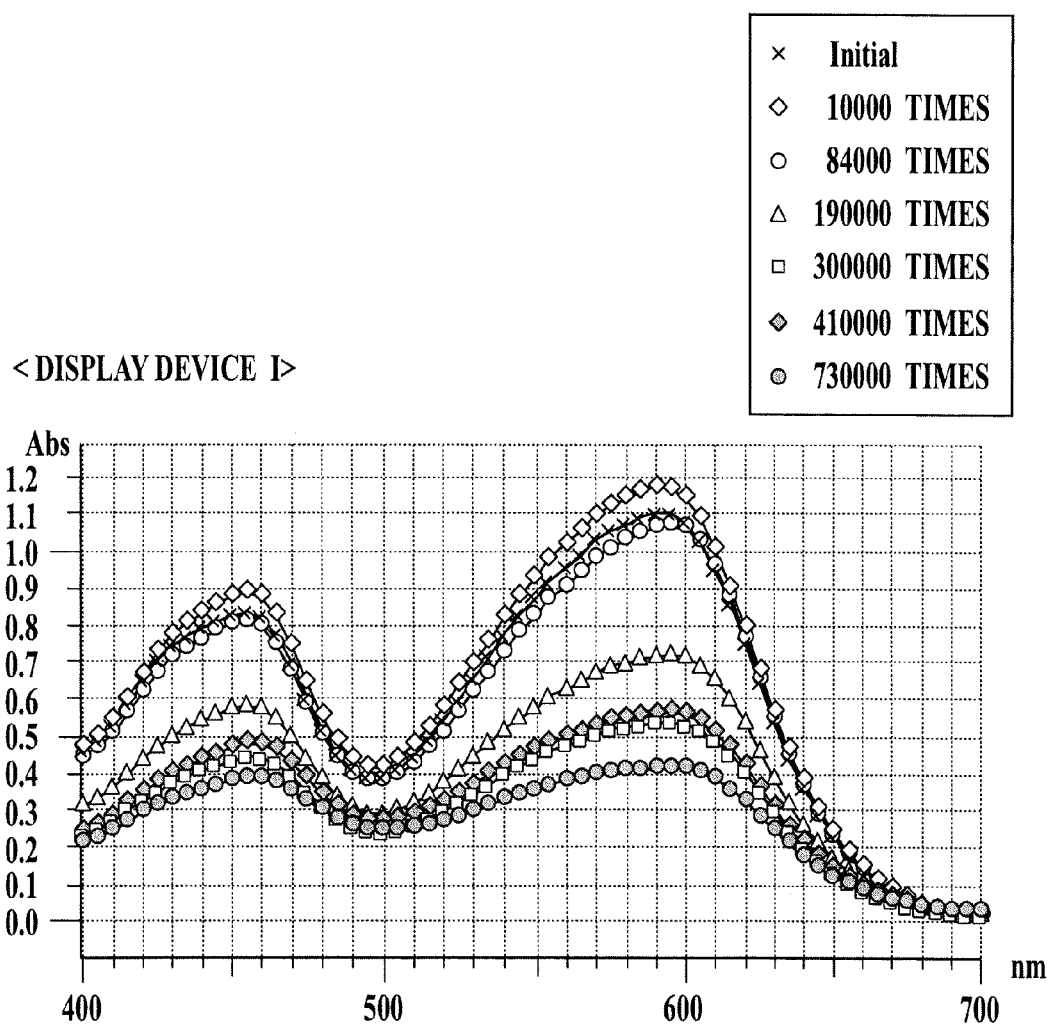
FIG. 7 is a diagram showing color optical density measurement results of a display device I (an electrochromic display device containing an electrochromic composition without a second display quality deterioration suppression compound (a ferrocene derivative))

In the display device I (electrochromic display device equipped with the electrochromic composition not containing the second display quality deterioration suppression compound (ferrocene derivative)), as shown in FIG. 7, no color remaining and no color changing of the ground color thereof were found, and, even when the number of times of operations increased to 10000 and 84000, the color optical density thereof did not lower. But, when further operations were repeated, the color optical density lowered.

Figure 8:
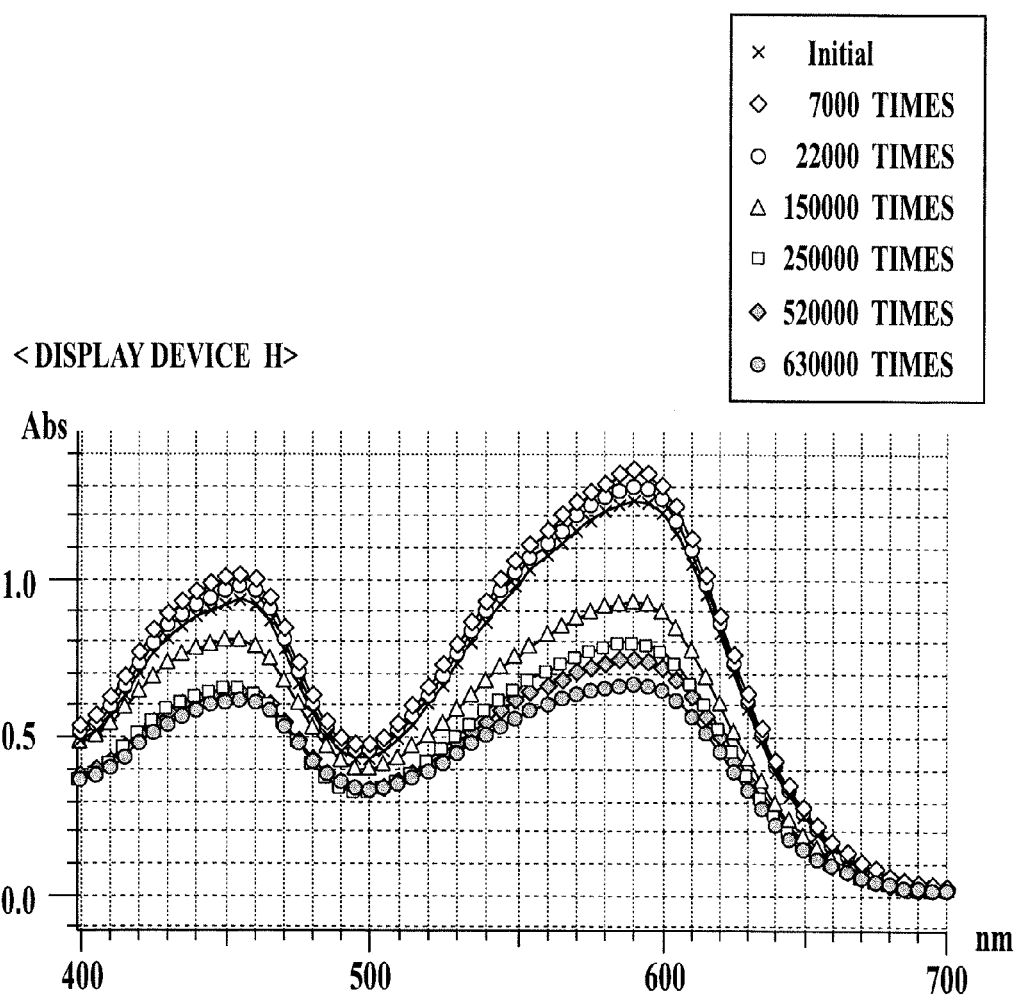
FIG. 8 is a diagram showing color optical density measurement results of a display device H (an electrochromic display device containing an electrochromic composition without the second display quality deterioration suppression compound (a ferrocene derivative))

Furthermore, in the display device H (the electrochromic display device equipped with the electrochromic composition not containing the second display quality deterioration suppression compound (ferrocene derivative)), as shown in FIG. 8, no color remaining and no color changing of the ground color thereof were found, and, even when the number of times of operations increased to 7000 and 22000, the color optical density thereof did not lower. But, when further operations were repeated, the color optical density lowered.

Figure 9:
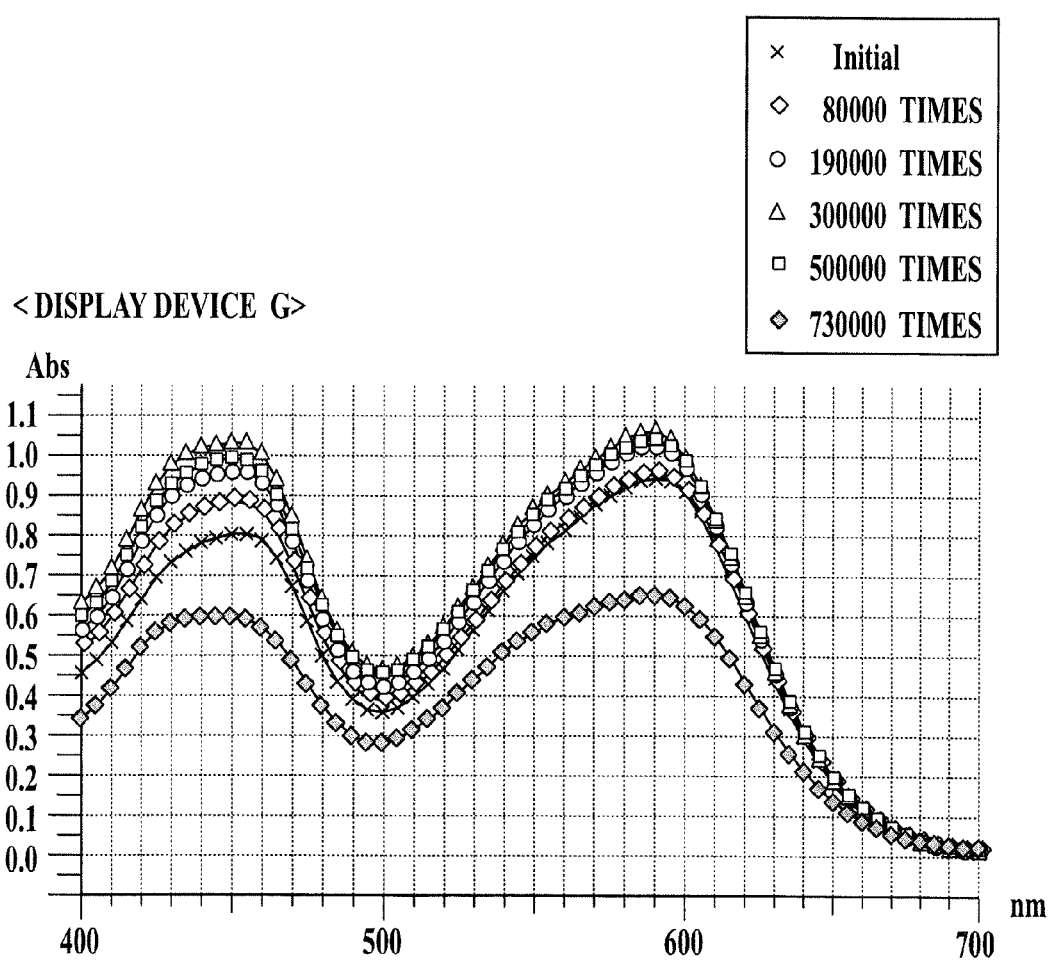
FIG. 9 is a diagram showing color optical density measurement results of a display device G (an electrochromic display device containing electrochromic composition including the first to the third display quality deterioration suppression compounds)

In the display device G (the electrochromic display device equipped with the electrochromic composition containing the first to the third display quality deterioration suppression compounds), as shown in FIG. 9, no color remaining and no color changing of the ground color thereof were found, and, even when the number of times of operations increased to 80000, 190000, 300000, and 500000, the color optical density thereof did not lower. But, when further operations were repeated, the color optical density lowered. That is, even when repetition operations were performed by 500000 times, the color optical density did not lower.

From the results mentioned above, it was found that the repetition stability of an electrochromic display device was further improved by making an electrochromic composition contain all of the three kinds of display quality deterioration compounds (the first display quality deterioration suppression compound (the hydroquinone derivative and/or the catechol derivative), the second display quality deterioration suppression compound (the ferrocene derivative) and the third display quality deterioration suppression compound (the compound having the carbonyl group)).

According to the electrochromic display device 100 of the present invention described above, the electrochromic display device includes: a first substrate 10; first electrodes 20 . . . provided on an upper surface of the first substrate 10; a second substrate 30 provided to be opposed to the first substrate 10 above the first substrate 10, the second substrate 30 formed of a transparent material; second electrodes 40 . . . provided on an undersurface of the second substrate 30, at least a part of the second electrodes 40 . . . being formed of a transparent electrode material; and an electrochromic composition layer 50 provided between the first substrate 10 and the second substrate 30. The electrochromic composition layer 50 contains an electrochromic composition 52 including a supporting electrolyte, a polar solvent, a leuco dye 52a, a hydroquinone derivative and/or a catechol derivative, a ferrocene derivative, and a compound having a carbonyl group.

That is, in the electrochromic display device 100 using the leuco dye 52a, the electrochromic composition 52 contains the first display quality deterioration suppression compound (hydroquinone derivative and/or catechol derivative), the second display quality deterioration suppression compound (ferrocene derivative), and the third display quality deterioration suppression compound (the compound having the carbonyl group)) in addition to the supporting electrolyte, the polar solvent, and the leuco dye 52a. Consequently the electrochromic display device 100 can suppress the deterioration of the display performance and the erasing performance and the coloration of the background of a display owing to the repetition of displaying and erasing. Thereby, the electrochromic display device 100 having superior repetition stability can be provided.

Furthermore, according to the electrochromic display device 100 of the present invention, the compound having the carbonyl group is at least any one of an acetophenone derivative, a dibenzoyl derivative (α-diketone compound), and a β-diketone compound. To put it concretely, the β-diketone compound is at least one of an acetylacetone derivative, a cyclohexanone derivative, a cyclohexane dione derivative, and a benzoylacetone derivative.

Accordingly, the electrochromic composition 52 is suitable because the electrochromic composition 52 contains a white compound as the compound having the carbonyl group.

Furthermore, according to the electrochromic display device 100 of the present invention, the polar solvent is at least one kind of an organic solvent having a property of passing a current by using the supporting electrolyte.

Accordingly, the electrochromic composition 52 is suitable because the electrochromic composition 52 contains the compound having a function of accelerating the passage of a current in order to be able to perform the coloring and the color erasing of the leuco dye 52a by blocking a voltage and/or a current.

Furthermore, according to the electrochromic display device 100 of the present invention, the electrochromic display device 100 executes a display by applying a current between the first electrodes 20 . . . and the second electrodes 40 . . . , and executes erasing of the display by applying a current between the first electrodes 20 . . . and the second electrodes 40 . . . in a direction opposite to the direction of the current to be applied for executing the display, and the absorbent 53 (an aluminum oxide and/or an aluminum hydroxide) to absorb the leuco dye 52a at a time of applying a current for executing the erasing is added to the electrochromic composition 52.

That is, because the leuco dye 52a is absorbed by the absorbent 53 in applying a current for executing the erasing, it is possible to prevent the leuco dye 52a from moving to the electrodes (first electrodes 20 . . . ) on the opposite side to the display electrodes (second electrodes 40 . . . ) and from forming a color display. Accordingly, by applying a current in the direction opposite to the direction of the current to be applied for executing the display, the display can surely be erased without strictly controlling the quantity of a current to be applied at the time of erasing the display.

Furthermore, according to the electrochromic display device 100 of the present invention, the supporting electrolyte is a compound represented by the aforesaid general formula (1) and/or a compound represented by the aforesaid general formula (2).

Consequently, because the electrochromic composition 52 contains the compound having a function of making a current easily flow through the electrochromic composition 52, the electrochromic composition 52 is suitable.

Furthermore, according to the electrochromic display device 100 of the present invention, a polymer compound is added to the electrochromic composition 52.

Consequently, the electrochromic composition 52 is suitable because the compound having a function of heightening the viscosity of the electrochromic composition 52 and making the handling of the electrochromic composition 52 easy is added to the electrochromic composition 52.

Furthermore, according to the electrochromic display device 100 of the present invention, the first electrodes 20 . . . are the plurality of electrodes extending in parallel with each other; the second electrodes 40 . . . are transparent display electrodes composed of the plurality of transparent electrodes extending in parallel with each other in the direction perpendicular to that of the first electrodes 20 . . . ; and pixels 60 are formed at regions where the first electrodes 20 . . . and the second electrodes 40 . . . three-dimensionally intersect with each other. The electrochromic composition layer 50 is equipped with the porous body 51 having the pores 51a . . . piercing the porous body 51 in the almost perpendicular direction to the first substrate 10 and the second substrate 30, and the electrochromic composition 52 is introduced into the insides of the pores 51a . . . of the porous body 51.

That is, only by introducing the electrochromic composition 52 into the insides of the pores 51a . . . of the porous body 51, a crosstalk between the pixels 60, 60 can be suppressed without providing any partition walls which are formed through a minute and troublesome process. Furthermore, because the pores 51a . . . formed in the porous body 51 pierce the porous body 51 in the almost perpendicular direction to the first substrate 10 and the second substrate 30, the resolution and the contrast becomes higher than those of the case of using a porous body in which pores are randomly formed, and the configuration, which is simple, can have a high display performance.

In addition, the present invention is not limited to the embodiment described above, but the embodiment can suitably be changed without departing from the spirit and the scope of the invention.

<Modification 1>

Figure 10A:
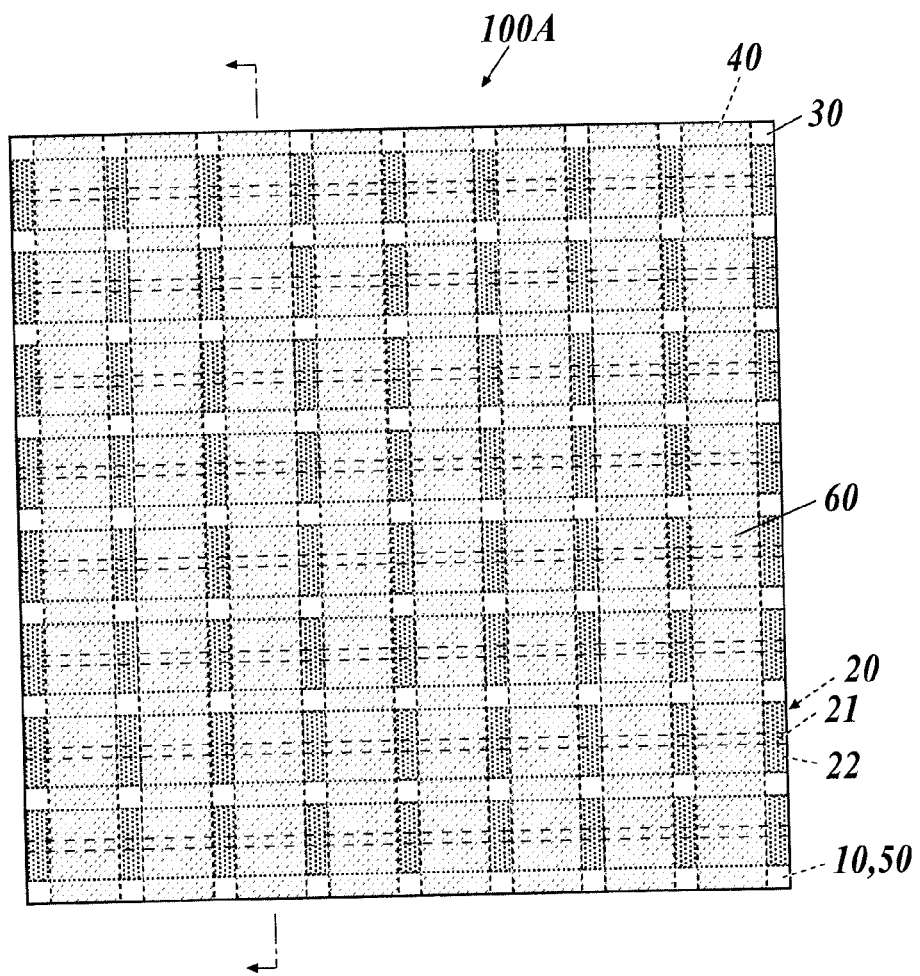
FIG. 10A is a plan view schematically showing an electrochromic display device of a modification 1.
Figure 10B:
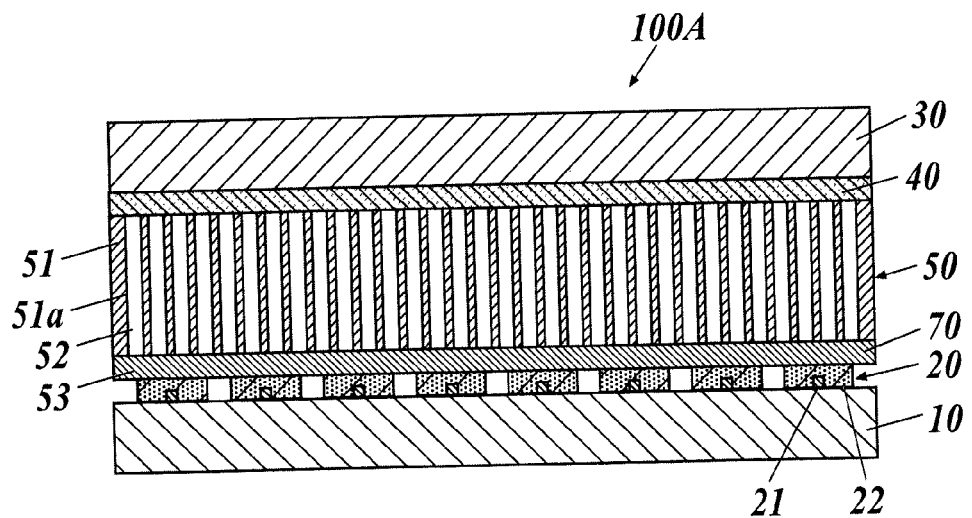
FIG. 10B is a sectional view schematically showing the electrochromic display device of the modification 1.

The absorbent 53 does not need to be added (dispersed) to the electrochromic composition 52 constituting the electrochromic composition layer 50 in the electrochromic display device 100 of the present invention, and, for example, may be provided between the first electrodes 20 . . . and the electrochromic composition layer 50 like an electrochromic display device 100A shown in FIG. 10B.

FIG. 10A is a plan view schematically showing the electrochromic display device 100A of a modification 1, and FIG. 10B is a sectional view schematically showing the electrochromic display device 100A of the modification 1.

The electrochromic display device 100A is composed of, for example, the first substrate 10, the first electrodes 20 . . . , the second substrate 30, the second electrodes 40 . . . , the electrochromic composition layer 50, and an absorption layer 70 provided between the first electrodes 20 . . . and the electrochromic composition layer 50.

The electrochromic composition layer 50 is composed of, for example, the porous body 51, having the pores 51a . . . ; the electrochromic composition 52, introduced in the insides of the pores 51a . . . ; and the like.

The electrochromic composition 52 contains a supporting electrolyte, a polar solvent, the leuco dye 52a, and a display quality deterioration suppression agent (a compound containing a hydroquinone derivative and/or a catechol derivative, a ferrocene derivative, and a carbonyl group) for suppressing the deterioration of the display quality of the electrochromic display device 100.

As a component capable of being added to the electrochromic composition 52, for example, a polymer compound for adjusting the physical properties (for example, thickening) of the electrochromic composition 52 can be given.

Here, in the electrochromic display device 100A of the modification 1, the absorbent 53 is not added to the electrochromic composition 52.

The absorption layer 70, for example, has a function of absorbing the leuco dye 52a at the time of applying a current between the first electrodes 20 . . . and the second electrodes 40 . . . for executing the erasing of a display.

The absorption layer 70, for example, is deposited on the first electrodes 20 . . . to contact with the electrochromic composition layer 50.

The absorption layer 70 is composed of, for example, the absorbent 53 (aluminum oxide and/or aluminum hydroxide), and a water soluble binder.

To put it concretely, the absorption layer 70 is formed by uniformly dispersing, for example, the absorbent 53 and the water soluble binder in a medium, such as water, to produce a dispersion liquid, and by coating and drying the dispersion liquid on the first electrodes 20 . . . .

In addition, in order to improve the whiteness degree of the absorption layer 70, the absorption layer 70 may be formed by producing a dispersion liquid in which a white pigment, such as titanium dioxide powder, is uniformly dispersed in a medium together with the absorbent 53, the water soluble binder, and the like, and by coating and drying the dispersion liquid on the first electrodes 20 . . . .

Although the absorbent 53 (aluminum oxide and/or aluminum hydroxide) is not particularly limited, an aluminum oxide, such as γ alumina having has a large surface area; an aluminum oxide having small particle diameters of 1 μm or less; an aluminum hydroxide having a large surface area; and an aluminum hydroxide having small particle diameters of 1 μm or less can preferably be used from a point of view of an adsorption effect and the like.

Furthermore, the water soluble binder used as a binder is not particularly limited, but, for example, cellulose derivatives, such as starch, gelatin, carboxymethylcellulose (CMC) and methylcellulose (MC); polyvinyl alcohol (PVA), polyacrylic polymers, polyacrylamide (PAM), and polyethylene oxide (PEO) can be used. Among them, polyvinyl alcohol can preferably be used.

The additive quantity of the water soluble binder is not particularly limited, but it is preferable to be within a range of from 0.1% by weight to 30% by weight of that of the absorbent 53, and more preferably to be within a range of 1-10% by weight. If the additive quantity of the water soluble binder is too small, the coated and formed absorption layer 70 easily receives physical damages, such as exfoliation to be easily caused by a touch. On the other hand, if the additive quantity of the water soluble binder is too large, the water soluble binder hinders the absorption effect of the absorbent 53 (aluminum oxide and/or aluminum hydroxide). Furthermore, too large additive quantity of the water soluble binder causes the heightening of the electric resistance and gives disadvantageous influences to the coloring display operation and the erasing operation of the electrochromic display device 100A, such as the lowering of the quantity of the passing current.

The aluminum oxides and/or the aluminum hydroxides can easily be obtained as the form of chemical products.

In the following, examples of the suitable commercially available aluminum oxides and aluminum hydroxides will be shown, but these are illustrations, and the aluminum oxides and the aluminum hydroxides are not limited to them.

As concrete examples of the commercially available absorbents 53, for example, aluminum oxide 60G Neutral (particle diameters: 4 μm-50 μm) for thin-layer chromatography, manufactured by Merck Co.; low soda alumina LS235 (particle diameter: 0.47 μm), activated alumina C200 (particle diameter: 4.4 μm), and aluminum hydroxide B1403 (particle diameter: 1.5 μm), manufactured by Nippon Light Metal Co., Ltd.; and γ alumina KC501 (particle diameter: 1 μm), manufactured by Sumitomo Chemical Co., Ltd. can be given.

<Manufacturing Method of Electrochromic Display Device>

A manufacturing method of the electrochromic display device 100A includes the following processes [1]-[7].

[1] First Substrate Preparation Process

The first substrate preparation process is a process for preparing the first substrate 10.

[2] First Evaporation Process

The first evaporation process is a process for providing the first electrodes 20 . . . on one surface of the first substrate 10.

[3] Second Substrate Preparation Process

The second substrate preparation process is a process for preparing the second substrate 30.

[4] Second Evaporation Process

The second evaporation process is a process for providing the second electrodes 40 . . . on one surface of the second substrate 30.

[5] Absorption Layer Set Process

The absorption layer set process is a process for setting the absorption layer 70 on the surfaces of the first electrodes 20 ... formed on the first substrate.

To put it concretely, for example, the absorbent 53 (aluminum oxide and/or aluminum hydroxide) is dispersed into a medium, such as water, together with the water soluble binder, such as polyvinyl alcohol, by using a ball milling, a homogenizer, a homomixer, an ultrasonic wave dispersion machine, or the like to produce a dispersion liquid. Then, the dispersion liquid is coated on the surfaces of the first electrodes 20 ... by a Meyer Bar, an applicator, or the like, and thereby the absorption layer 70 is formed.

[6] Porous Body Set Process

The porous body set process is a process for setting the porous body 51 between the first substrate 10, on which the absorption layer 70 and the first electrodes 20 ... are formed, and the second substrate 30, on which the second electrodes 40 ... is formed.

[7] Pasting Process

The pasting process is a process for pasting the first substrate 10, on which the absorption layer 70 and the first electrodes 20 ... are formed, and the second substrate 30, on which the second electrodes 40 ... are formed, together, and enclosing the electrochromic composition 52, to which predetermined additives (compounds (a compound having the general formula represented by the aforesaid formula (1) and/or a compound represented by the aforesaid formula (2), and a compound represented by the aforesaid formula (3) and/or a compound represented by the aforesaid formula (4)), a polymer compound, a hindered phenols, and the like) are added. In addition, a compound having the general formula represented by the following formula (57), and a compound represented by the following formula (58) and/or a compound represented by the following formula (59) may be added to the electrochromic composition 52 in place of the compound having the general formula represented by the aforesaid formula (1) and/or the compound represented by the aforesaid formula (2), and the compound represented by the aforesaid formula (3) and/or the compound represented by the aforesaid formula (4).

<Drive Method of Electrochromic Display Device>

The electrochromic display device 100A is driven by, for example, a passive matrix drive.

Because the drive of the electrochromic display device 100A of the modification 1 is almost the same as that of the electrochromic display device 100 of the embodiment, the minute description thereof is omitted.

Here, in the electrochromic display device 100A of the modification 1, because the leuco dye 52a is absorbed by the absorbent 53 (aluminum oxide and/or aluminum hydroxide) contained in the absorption layer 70 at the time of applying a current for executing the erasing, without strictly controlling the quantity of the current to be applied in applying the current for executing the erasing unlike the conventional display device, it is possible to prevent the leuco dye 52a from moving to the surfaces of the first electrodes 20 ... and from coloring.

To put it concretely, the leuco dye 52a polarizes in the solution. The absorbent 53 (aluminum oxide and/or aluminum hydroxide) has a feature of having a large specific surface area and a high absorption ability, and the surface of the absorbent 53 is polarized. Because the second electrodes 40 ... are charged to be positive in applying a current for executing a display of coloring, the leuco dye 52a, which is an electron donative, gives electrons to the second electrodes 40 ... to color, and executes the display. On the other hand, in applying a current for executing the erasing, because the current is applied in the direction opposite to the direction at the time of executing the display, the second electrodes 40 ... are charged to be negative. The leuco dye 52a receives electrons from the negatively charged second electrodes 40 ... to erase coloring, and then the coloring is erased. Then, the leuco dye 52a, which has changed to be colorless, moves into the direction of the first electrodes 20 ..., but the leuco dye 52a moves to the absorption layer 70 owing to the existence of the absorbent 53 having a high absorption ability and a polarized surface. Then, the leuco dye 52a is trapped and absorbed by the absorbent 53. Consequently, in the electrochromic display device 100A of the modification 1, it is possible to prevent the leuco dye 52a from moving to the surfaces of the first electrodes 20 ... at the time of applying a current for executing the erasing.

According to the electrochromic display device 100A of the modification 1 described above, the electrochromic display device 100A is provided with the absorption layer 70 between the first electrodes 20 ... and the electrochromic composition layer 50, which absorption layer 70 contains the absorbent 53 (aluminum oxide and/or aluminum hydroxide) for absorbing the leuco dye 52a at the time of applying a current for executing the erasing.

That is, at the time of applying a current for executing the erasing, because the dye is absorbed by the aluminum oxide and/or aluminum hydroxide, it is possible to prevent the dye from moving to the electrodes on the opposite side to the display electrodes and from forming a colored display. Consequently, a display can surely be erased without strictly controlling the quantity of a current to be applied at the time of erasing the display by applying a current in the direction opposite to the direction of the current to be applied for executing the display.

In addition, the structures of the first electrodes 20 ... in the embodiment and the modification 1 are arbitrary as long as the first electrodes 20 ... are formed on the upper surface of the first substrate 10, and the structures of the second electrodes 40 ... are arbitrary as long as the second electrodes 40 ... are formed on the undersurface of the second substrate 30 and at least a part of the second electrodes 40 ... is formed of a transparent electrode material.

To put it concretely, for example, the first electrodes 20 ... may be formed in lines each having a width only by using the quality of material constituting metal electrodes, or may be formed in lines each having a width only by using the quality of material constituting transparent electrodes.

Industrial Applicability

The present invention can be applied to, for example, various display devices, such as electronic paper.

REFERENCE NUMERALS

| Reference Numerals | |
|---|---|
| 10 | first substrate |
| 20 | first electrode |
| 30 | second substrate |
| 40 | second electrode |
| 50 | electrochromic composition layer |
| 52 | electrochromic composition |
| 52a | leuco dye |
| 53 | absorbent (aluminum oxide and/or aluminum hydroxide) |
| 60 | pixel |
| 70 | absorption layer |
| 100, 100A | electrochromic display device |

The invention claimed is:

1. An electrochromic display device, comprising:
a first substrate;
a first electrode provided on an upper surface of the first substrate;
a second substrate provided to be opposed to the first substrate above the first substrate, the second substrate being formed of a transparent material;
a second electrode provided on an undersurface of the second substrate, at least a part of the second electrode being formed of a transparent electrode material; and
an electrochromic composition layer provided between the first substrate and the second substrate, the electrochromic composition layer containing an electrochromic composition including a supporting electrolyte, a polar solvent, a leuco dye, a hydroquinone derivative and/or a catechol derivative, a ferrocene derivative, and a compound having a carbonyl group.

2. The electrochromic display device according to claim 1, wherein
the compound having the carbonyl group is at least one member selected from the group consisting of an acetophenone derivative, a dibenzoyl derivative, and a β-diketone compound.

3. The electrochromic display device according to claim 2, wherein
the β-diketone compound is at least one member selected from the group consisting of an acetylacetone derivative, a cyclohexanone derivative, a cyclohexane dione derivative, and a benzoylacetone derivative.

4. The electrochromic display device according to claim 1, wherein
the polar solvent is at least one kind of an organic solvent having a property of passing a current by using the supporting electrolyte.

5. The electrochromic display device according to claim 1, wherein
the electrochromic display device shows a display on the electrochromic display device by applying a first current between the first electrode and the second electrode, and erases the display by applying a second current between the first electrode and the second electrode in a direction opposite to a direction of the first current, and
an aluminum oxide and/or an aluminum hydroxide to absorb the leuco dye at a time of applying the second current is added to the electrochromic composition.

6. The electrochromic display device according to claim 1, further comprising an absorption layer containing an aluminum oxide and/or an aluminum hydroxide, the absorption layer being provided between the first electrode and the electrochromic composition layer, wherein
the electrochromic display device shows a display on the electrochromic display device by applying a first current between the first electrode and the second electrode, and erases the display by applying a second current between the first electrode and the second electrode in a direction opposite to a direction of the first current, and
the absorption layer absorbs the leuco dye at a time of applying the second current.

7. The electrochromic display device according to claim 1, wherein
the supporting electrolyte is a compound represented by a following general formula (1) and/or a compound represented by a following general formula (2):

$$M_1 X_1 \quad (1)$$

wherein $M_1$ is selected from Li, Na, K, Rb, Cs and $NH_4$;
$X_1$ is selected from $ClO_4$, $BF_4$, $CF_3SO_3$, or $PF_6$:

$$(R_a)_n(R_b)_m NX_2 \quad (2)$$

wherein $R_a$ is selected from an alkyl group and an aryl group;
Rb denotes an alkyl group;
N denotes a nitrogen atom;
$X_2$ is selected from Cl, Br, I, $ClO_4$, $BF_4$, $CF_3SO_3$, and $PF_6$;
n denotes an integer of 0 to 2;
m denotes 4-n.

8. The electrochromic display device according to claim 1, wherein
a polymer compound is added to the electrochromic composition.

9. The electrochromic display device according to claim 1, wherein
the first electrode is one of a plurality of electrodes extending in parallel with each other;
the second electrode is one of transparent display electrodes composed of a plurality of transparent electrodes extending in parallel with each other in a direction perpendicular to a direction of the first electrode; and
pixels are formed at regions where the first electrode and the second electrode three-dimensionally intersect with each other.

10. The electrochromic display device according to claim 1, wherein the electrochromic composition has fluidity.

11. The electrochromic display device according to claim 1, wherein the electrochromic composition layer comprises a porous body that includes pores, and that holds the electrochromic composition between the first substrate and the second substrate.

12. The electrochromic display device according to claim 11, wherein the electrochromic composition is introduced into the pores.

13. The electrochromic display device according to claim 11, wherein the pores pierce the porous body in a direction substantially perpendicular to the first substrate and the second substrate.

* * * * *